US008865823B2

(12) United States Patent
Peters

(10) Patent No.: US 8,865,823 B2
(45) Date of Patent: Oct. 21, 2014

(54) TRIBLOCK COPOLYMER, METHOD FOR ITS FORMATION, AND COMPATIBILIZED COMPOSITIONS COMPRISING IT

(71) Applicant: SABIC Innovative Plastics IP B.V., Bergen op Zoom (NL)

(72) Inventor: Edward Norman Peters, Lenox, MA (US)

(73) Assignee: Sabic Global Technologies B.V. (NL)

( * ) Notice: Subject to any disclaimer, the term of this patent is extended or adjusted under 35 U.S.C. 154(b) by 136 days.

(21) Appl. No.: 13/756,692

(22) Filed: Feb. 1, 2013

(65) Prior Publication Data

US 2014/0221552 A1    Aug. 7, 2014

(51) Int. Cl.
*C08G 81/00*    (2006.01)
*C08L 53/00*    (2006.01)

(52) U.S. Cl.
CPC ............... *C08G 81/00* (2013.01); *C08L 53/00* (2013.01)
USPC .............................. 524/505; 525/89; 525/523

(58) Field of Classification Search
CPC ........................................................ C08L 53/00
USPC .................................... 524/505; 525/89, 523
See application file for complete search history.

(56) References Cited

U.S. PATENT DOCUMENTS

| | | | |
|---|---|---|---|
| 3,306,874 A | 2/1967 | Hay | |
| 3,409,581 A | 11/1968 | Hagan, Jr. | |
| 3,631,126 A | 12/1971 | Snodgrass et al. | |
| 4,853,423 A | 8/1989 | Walles et al. | |
| 4,912,172 A | 3/1990 | Hallgren et al. | |
| 5,108,842 A | 4/1992 | Hallgren et al. | |
| 5,141,791 A | 8/1992 | Chao et al. | |
| 5,266,673 A * | 11/1993 | Tsukahara et al. | 528/212 |
| 5,916,496 A | 6/1999 | Weber | |
| 6,159,264 | 12/2000 | Holl | |
| 6,194,496 B1 | 2/2001 | Weber et al. | |
| 6,770,691 B2 | 8/2004 | Yeager | |
| 7,671,167 B2 | 3/2010 | Carrillo et al. | |
| 2005/0075472 A1 | 4/2005 | Yeager et al. | |
| 2005/0154130 A1 | 7/2005 | Adedeji et al. | |
| 2006/0079642 A1 | 4/2006 | Adedeji et al. | |
| 2006/0135695 A1 | 6/2006 | Guo et al. | |
| 2007/0238831 A1 | 10/2007 | Klei et al. | |
| 2007/0287801 A1 | 12/2007 | Davis et al. | |
| 2012/0029129 A1 | 2/2012 | Ting et al. | |
| 2012/0329939 A1 | 12/2012 | Peters | |

FOREIGN PATENT DOCUMENTS

| | | |
|---|---|---|
| KR | 1020060083987 A | 7/2006 |
| PL | 164813 B1 | 6/1992 |
| WO | 9532243 | 11/1995 |
| WO | 2009104107 A1 | 8/2009 |

OTHER PUBLICATIONS

Chiang et al., "Polymer blends of polyamide-6 (PA6) and poly(phenylene ether) (PPE) compatibilized by a multifunctional epoxy coupler", Journal of Polymer Science: Part B: Polymer Physics, 1998, vol. 36, No. 11, pp. 1805-1819, Abstract only, 3 pages.
Chao et al.; "Poly(2,6-Dimethyl-1,4-Phenylene Ether) (PPE) Redistribution and Its Significance in the Preparation of PPE/Epoxy Laminate"; Reactive Polymers, 15; pp. 9-23; (1991).
Christiansen et al., "The Phase Behavior of Ternary Blends Containing Polycarbonate, Phenoxy, and Polycaprolactone", Journal of Applied Polymer Science, vol. 34, pp. 537-548, 1987.
Coleman et al., "FTi.r. studies of polymer blends containing the poly(hydroxy ether of bisphenol A) and pol(e-caprolactone)", Polymer, vol. 24, pp. 251-256, 1983.
D.E.R. 317 Liquid Epoxy Resin, DOW Product Information Sheet, downloaded from http://msdssearch.dow.com/PublishedLiteratureDOWCOM/dh_01e8/0901b803801e8ef1.pdf?filepath=epoxy/pdfs/noreg/296-01533.pdf&fromPage=GetDoc on Sep. 14, 2011, 3 pages.
D.E.R. 6155 Solid Epoxy Resin, DOW Product Information, downloaded from http://msdssearch.dow.com/PublishedLiteratureDOWCOM/dh_02db/0901b803802db6cb.pdf?filepath=epoxy/pdfs/noreg/296-01592.pdf&fromPage=GetDoc, on Sep. 14, 2011, 3 pages.
D.E.R. 667E Solid Epoxy Resin, DOW Product Information Sheet, downloaded from http://msdssearch.dow.com/PublishedLiteratureDOWCOM/dh_02db/0901b803802db68b.pdf?filepath=epoxy/pdfs/noreg/296-01489.pdf&fromPage=GetDoc on Sep. 14, 2011, 3 pages.
D.E.R. 668-20 Solid Epoxy Resin, DOW Product Information, downloaded from http://msdssearch.dow.com/PublishedLiteratureDOWCOM/dh_02db/0901b803802db6a0.pdf?filepath=epoxy/pdfs/noreg/296-01479.pdf&fromPage=GetDoc on Sep. 14, 2011, 3 pages.
Dekkers et al., Morphology and deformation behaviour of toughened blends of poly(butylene terephthalate), polycarbonate and poly(phenylene ether), Polymer, vol. 32, No. 12, pp. 2150-2153 1991.
DOW Answer Center, "DOW Epoxy—Type Definition", last updated Aug. 13, 2010, 1 page, retrieved from http://dow-answer.custhelp.com/app/answers/detail/a_id/9928/~/dow-epoxy—type-definition on Mar. 7, 2011.
Eguiazabal et al., "Glass transition temperatures in blends of poly(N-vinyl-2-pyrrolidone) with a copolymer of bisphenol A and epichlorohydrin or with poly(vinyl butyral)", Makromol. Chem. 185, pp. 1761-1766, 1984.
EPON Resin 1001F, Technical Data Sheet, Re-issued Sep. 2007, downloaded from http://www.hexion.com/Products/TechnicalDataSheet.aspx?id=4017, on Sep. 14, 2011, 4 pages.
EPON Resin 1002F, Technical Data Sheet, Re-issued Sep. 2007, downloaded from http://www.hexion.com/Products/TechnicalDataSheet.aspx?id=4025 on Sep. 14, 2011, 4 pages.
EPON Resin 1007F, Technical Data Sheet, Re-issued Sep. 2007, downloaded from http://www.hexion.com/Products/TechnicalDataSheet.aspx?id=4029 on Sep. 14, 2011, 4 pages.

(Continued)

*Primary Examiner* — Kelechi Egwim
(74) *Attorney, Agent, or Firm* — Cantor Colburn LLP

(57) ABSTRACT

A poly(phenylene ether)-poly(hydroxy ether)-poly(phenylene ether) (PPE-PHE-PPE) triblock copolymer is formed by reaction of a monohydroxy-terminated poly(phenylene ether) with a diepoxy-terminated poly(hydroxy ether) in the presence of a base. The PPE-PHE-PPE triblock copolymer is useful as a compatibilizer in blends of polar polymers and non-polar polymers. The PPE-PHE-PPE triblock copolymer is also useful as a compatibilizer for non-polar polymers and polar fillers.

20 Claims, 5 Drawing Sheets

(56) References Cited

OTHER PUBLICATIONS

Harris et al., "Miscible Binary Blends Containing the Polyhydroxy Ether of Bisphenol-A and Various Aliphatic Polyesters", Journal of Applied Polymer Sciences, vol. 27, 839-855, 1982.
Hobbs et al., "Reactive Processing of Blends of Functionalized Poly(2,6-dimethyl-1,4 phenylene oxide) and Poly (butylene terephthalate", Polymer Preprints, vol. 33, No. 2, pp. 614-615, 1992.
Iribarren, et al.; "Phenoxy Resin: Characterization, Solution Properties, and Inverse Gas Chromatography Investigation of Its Potential Miscibility with Other Polymers"; Journal of Applied Science; 37; pp. 3459-3470; (1989).
Jang et al., "Performance Improvement of Glass-Fiber-Reinforced Polystyrene Composite Using a Surface Modifier. II. Mechanical Properties of Composites", Journal of Applied Polymer Science, vol. 59, pp. 2069-2077, 1996.
JP 05-125234 Abstract; Application 03-292613; filed Nov. 8, 1991; "Thermoplastic Resin Composition"; 1 page.
Lee et al., New Linear Polymers, "Phenoxy Resins" and "Properties of Adhesive Compounds", 1967, McGraw-Hill Inc. Book Company New York, 5 pages.
Liu et al., "In Situ Compatibilization of PBT/PPO Blends", Eur. Polym. J. vol. 32, No. 1, pp. 91-99, 1996.
Lo et al., "Reactive Compatibilation of PET and PPE Belends of Epoxy Couplers", J. Appl. Polym. Sci. 65, pp. 739-753, 1997.
Peters et al. "Engineering Thermoplastics", Applied Polymer Science, pp. 177-196, 2000.
Peters, "Introduction to Polymer Characterization", Chapter 1—Comprehensive Desk Reference of Polymer Characterization and Analysis, pp. 3-29, 2003.
Peters, "Polyphenylene Ether (PPE) Blends and Alloys", Chapter 9—Engineering Plastics Handbook, pp. 181-220, 2006.
Peters, "Poly(2,6-dimethyl-1,4-phenylene oxide)", Polymer Data Handbook, 2nd Edition, pp. 534-537, 2009.
PPO* Resin 640, SABIC Data Sheet, downloaded from http://kbam.geampod.com/KBAM/Reflection/Assets/20423.pdf, on Sep. 14, 2011, 1 page.
PPO* Resin SA90, SABIC Data Sheet, downloaded from http://www.sabic-ip.com/gepapp/eng/weather/weatherhtml?sltRegionList=1002002000&sltPrd=1002003013&sltGrd=1002041836&sltUnit=0&sltModule=DATASHEETS&sltVersion=Internet&sltType=Online, on Sep. 14, 2011, 1 page.
PPO* SA90-100, SABIC Data Sheet, downloaded from http://www.sa bic-ip.com/resins/DataSheet/Internet/HTML1002002000_1002003013_1002040979_Metric.htm, on Mar. 7, 2011, 2 pages.
Reinking, et al.; "Polyhydroxyethers. I. Effect of Structure on Properties of High Molecular Weight Polymers from Dihydric Phenols and Epichlorodydrin"; Journal of Applied Polymer Science, vol. 7, 1963, pp. 235-2144.
Rejdych et al., "Synthesis and properties of block diepoxides oligo(xylylen oxy)diepoxides", Polymers—Plastic Macromolecular 40, No. 2, 1995, 12 pages, English Translation.
Robeson et al., "Miscible Blends of Poly(butylene terephthalate) and the Polyhydroxyether of Bisphenol A", Journal of Applied Polymer Science, vol. 23, pp. 645-659, 1979.
Robeson, et al.; "Miscibility of the Poly(hydroxy ether) of Bisphenol A with Water-Soluble Polyethers"; Macromolecules 14, 1981, pp. 1644-1650.
Singh et al., "the Miscibility of Polyethersulfone with Phenoxy Resin", Journal of Macromolecular Science—Physics, B25(1&2), pp. 65-87, 1986.
Uriarte, et al., "Miscibility and Phase Separation in Poly(vinyl methylether)/Poly(bisphenol A hydroxy ether) Blends", Macromolecules 20, 1987, pp. 3038-3042.
Yamamoto, "With block *graft copolymer improvement and compatibilization of polymer", J. Jap. Rup. Soc., vol. 62, 14 pages, 1990, Machine Translation.

* cited by examiner

TRIBLOCK COPOLYMER, METHOD FOR ITS FORMATION, AND COMPATIBILIZED COMPOSITIONS COMPRISING IT

BACKGROUND OF THE INVENTION

Poly(hydroxy ether)s, also known as phenoxy resins, are linear polymers typically prepared by copolymerization of 2,2-bis(4 hydroxyphenyl)propane (bisphenol A) with 2,2-bis (4-hydroxyphenyl)propane-epichlorohydrin polymers (epoxy resins). Phenoxy resins contain about 6 percent by weight secondary alcohol groups.

Phenoxy resins are used to enhance the properties of coating, adhesive, ink, composite, fiber, and plastic compositions. The pendant hydroxy groups and backbone ether linkages promote wetting and bonding to polar substrates, pigments, and fillers. The addition of phenoxy resin to thermoplastics can help control process rheology in extrusion, molding, and film-forming operations. The amorphous nature of phenoxy resins can be helpful in controlling the crystallization kinetics of crystalline and semicrystalline thermoplastic materials.

Phenoxy resins have excellent compatibility with polar polymers, such as polyesters, polycarbonates, polyamides, and polyurethanes. However, phenoxy resins have low compatibility with polystyrene, poly(phenylene ether), polyolefins, (meth)acrylics and other non-polar polymers. The low compatibility of phenoxy resins with non-polar polymers limits their usefulness as additives for non-polar polymers, as compatibilizing agents for blends of polar and non-polar polymers, and as compatibilizing agents for blends of non-polar polymers and polar fillers.

BRIEF SUMMARY OF EMBODIMENTS OF THE INVENTION

One embodiment is a poly(phenylene ether)-poly(hydroxy ether)-poly(phenylene ether) triblock copolymer, wherein each poly(phenylene ether) block independently has the structure

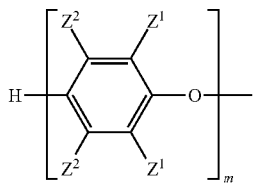

wherein m is 5 to 50; each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and wherein the poly(hydroxy ether) block has the structure

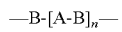

wherein A is a residue of structure

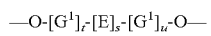

wherein each $G^1$ is independently at each occurrence a $C_6$-$C_{20}$ aromatic radical, and E is independently at each occurrence a direct bond, or a structure selected from the group consisting of

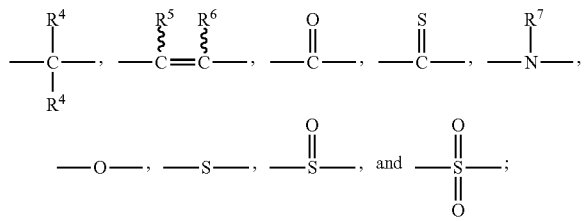

wherein each occurrence of $R^4$-$R^7$ is independently hydrogen or $C_1$-$C_{12}$ hydrocarbyl, s is 0 or 1, and t and u are each independently 1 to 10; and wherein B is a residue of structure

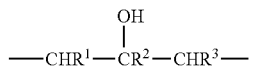

wherein $R^1$ to $R^3$ are each independently hydrogen, or $C_1$-$C_{12}$ hydrocarbyl; and wherein n is 2 to 60.

Another embodiment is a method of forming a poly(phenylene ether)-poly(hydroxy ether)-poly(phenylene ether) triblock copolymer, comprising: reacting a monohydroxy-terminated poly(phenylene ether) with a diepoxy-terminated poly(hydroxy ether) in the presence of a base.

Another embodiment is a composition comprising, based on the total weight of the composition: 30 to 93 weight percent of a polar polymer selected from the group consisting of cellulose esters, poly(alkyl(meth)acrylate)s, polyamides, polycarbonates, polyesters, polyetherimides, polysulfones, polyethersulfones, poly(ethylene-ethyl acrylate)s, poly(ethylene-vinyl acetate)s, polyurethanes, poly(vinyl acetate)s, poly(vinyl alcohol)s, poly(styrene-acrylonitrile)s, poly(styrene-maleic anhydride)s, poly(vinyl butyral)s, and combinations thereof; 5 to 68 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof; and 2 to 20 weight percent of a poly(phenylene ether)-poly(hydroxy ether)-poly(phenylene ether) triblock copolymer.

Another embodiment is a composition comprising, based on the total weight of the composition: 30 to 93 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof; 5 to 50 weight percent of polar filler selected from the group consisting of glass fibers, glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, ceramic fibers, and combinations thereof; and 2 to 20 weight percent of a poly(phenylene ether)-poly(hydroxy ether)-poly(phenylene ether) triblock copolymer.

These and other embodiments are described in detail below.

DETAILED DESCRIPTION OF THE INVENTION

Figure 1:
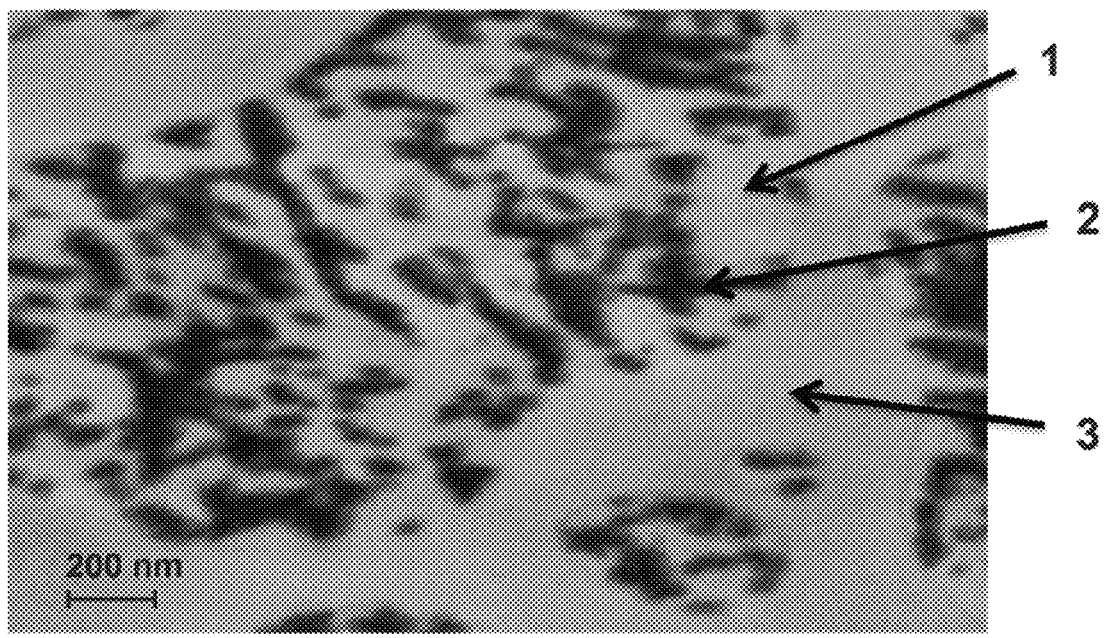
FIG. 1 is a scanning transmission electron micrograph obtained at 25,000× magnification of the Comparative Example 3 composition with poly(butylene terephthalate), poly(phenylene ether), polystyrene-poly(ethylene-butylene)-polystyrene, and 5 weight percent poly(hydroxy ether). Different components of the phases of the composition are labeled. "1" is poly(phenylene ether) within a poly(phenylene ether)/polystyrene-poly(ethylene-butylene)-polystyrene disperse phase domain. "2" is polystyrene-poly(ethylene-butylene)-polystyrene within a poly(phenylene ether)/polystyrene-poly(ethylene-butylene)-polystyrene disperse phase domain. "3" is a poly(butylene terephthalate) continuous phase.

Poly(phenylene ether)-Poly(hydroxy ether)-Poly(phenylene ether) Triblock Copolymer One embodiment is a poly(phenylene ether)-poly(hydroxy ether)-poly(phenylene ether) triblock copolymer, wherein each poly(phenylene ether) block independently has the structure

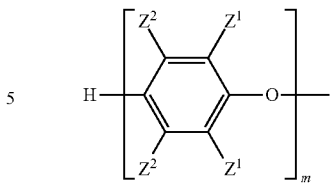

wherein m is 5 to 50; each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and wherein the poly(hydroxy ether) block has the structure

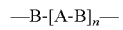

wherein A is a residue of structure

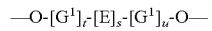

wherein each $G^1$ is independently at each occurrence a $C_6$-$C_{20}$ aromatic radical, and E is independently at each occurrence a direct bond, or a structure selected from the group consisting of

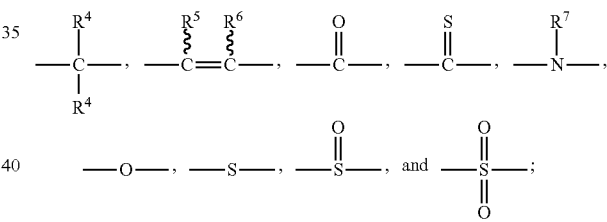

wherein each occurrence of $R^4$-$R^7$ is independently hydrogen or $C_1$-$C_{12}$ hydrocarbyl, s is 0 or 1, and t and u are each independently 1 to 10, specifically 1 to 5, more specifically 1; and wherein B is a residue of structure

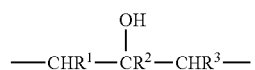

wherein $R^1$ to $R^3$ are each independently hydrogen, or $C_1$-$C_{12}$ hydrocarbyl; and wherein n is 2 to 60.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxy groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

Within the range of 5 to 50, the number of phenylene ether repeat units, m, in each poly(phenylene ether) block can independently be 10 to 40, specifically 10 to 30.

In some embodiments, each poly(phenylene ether) block independently has a number average molecular weight of 1000 to 5000 atomic mass units, specifically 1500 to 4000 atomic mass units.

In some embodiments, each poly(phenylene ether) block independently comprises 2,6-dimethyl-1,4-phenylene ether units, 2,3,6-trimethyl-1,4-phenylene ether units, or a combination thereof. In these embodiments, poly(phenylene ether) block comprises phenylene ether units in which each occurrence of $Z^1$ is methyl, at least one occurrence of $Z^2$ is hydrogen, and the other occurrence of $Z^2$ is hydrogen or methyl.

In some embodiments, each poly(phenylene ether) block independently has the structure

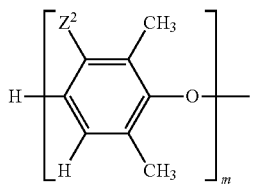

wherein m is 10 to 40, and each occurrence of $Z^2$ is independently hydrogen or methyl.

The poly(hydroxy ether) block has the structure

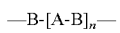

wherein A is a residue of structure

wherein each $G^1$ is independently at each occurrence a $C_6$-$C_{20}$ aromatic radical, and E is independently at each occurrence a direct bond, or a structure selected from the group consisting of

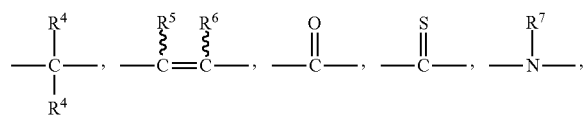

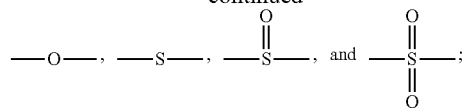

wherein each occurrence of $R^4$-$R^7$ is independently hydrogen or $C_1$-$C_{12}$ hydrocarbyl, s is 0 or 1, and t and u are each independently 1 to 10; and wherein B is a residue of structure

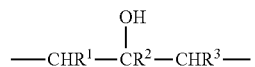

wherein $R^1$ to $R^3$ are each independently hydrogen, or $C_1$-$C_{12}$ hydrocarbyl; and wherein n is 2 to 60. Within the range of 2 to 60, the number of hydroxy ether repeat units, n, in the poly(hydroxy ether) block can be 5 to 50, specifically 10 to 30.

In some embodiments, the poly(hydroxy ether) block has a number average molecular weight of 2,000 to 10,000 atomic mass units, specifically 3000 to 7000 atomic mass units.

In some embodiments, the poly(hydroxy ether) block has the structure

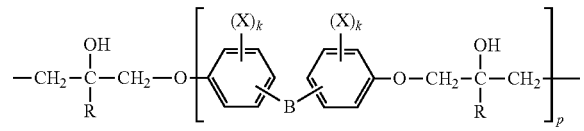

wherein each occurrence of R is independently hydrogen or methyl; each occurrence of k is independently 0, 1, 2, 3, or 4; each occurrence of X is independently chloro, fluoro, bromo, $C_1$-$C_{18}$ hydrocarbyl optionally further comprising a member or members selected from carboxy, carboxamide, ketone, aldehyde, alcohol, halogen, and nitrile; each occurrence of B is independently a carbon-carbon single bond, $C_1$-$C_{18}$ hydrocarbylene, carbonyl, sulfide, sulfonyl, sulfinyl, phosphoryl, and silane; and p is independently 2 to 20.

In some embodiments, the poly(hydroxy ether) block has the structure

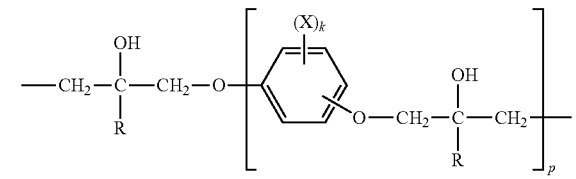

wherein R, X, k, and p are as defined above.

In some embodiments, the poly(hydroxy ether) block has the structure

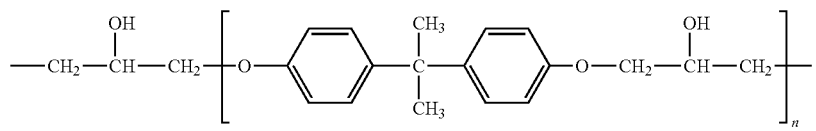

wherein n is 2 to 60, specifically 5 to 50, more specifically 10 to 30.

In some embodiments of the poly(phenylene ether)-poly(hydroxy ether)-poly(phenylene ether) triblock copolymer, each poly(phenylene ether) block independently comprises 2,6-dimethyl-1,4-phenylene ether units, 2,3,6-trimethyl-1,4-phenylene ether units, or a combination thereof; and the poly(hydroxy ether) block has the structure

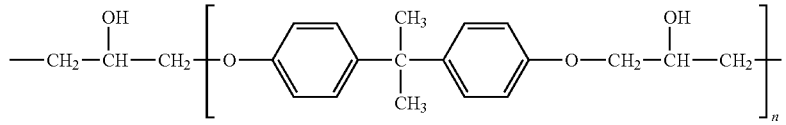

wherein n is 5 to 50.

It will be understood that the PPE-PHE-PPE triblock copolymer necessarily has a mole ratio of poly(phenylene ether) blocks to poly(hydroxy ether) blocks of 2:1. However, the weight content of each block type can vary considerably depending on block structure and block length. For example, in some embodiments, the PPE-PHE-PPE triblock copolymer comprises 20 to 80 weight percent poly(phenylene ether) blocks and 80 to 20 weight percent poly(hydroxy ether) block, based on the total weight of the triblock copolymer. Within this range, the weight percent of poly(phenylene ether) blocks can be 30 to 70 weight percent, specifically 40 to 60 weight percent, and the weight percent of poly(hydroxy ether) blocks will vary accordingly.

The present poly(phenylene ether)-poly(hydroxy ether)-poly(phenylene ether) triblock copolymers exhibit two glass transition temperatures. This distinguishes the present triblock copolymers from the poly(phenylene ether)-poly(hydroxy ether) multiblock copolymers exhibiting a single glass transition temperature, as described in United State Patent Application Publication No. US 2012/0329939 A1 of Peters. In some embodiments, the poly(phenylene ether)-poly(hydroxy ether)-poly(phenylene ether) triblock copolymer exhibits a first glass transition temperature of 95 to 115° C., corresponding to a poly(hydroxy ether) phase, and a second glass transition temperature of 170 to 220° C., corresponding to a poly(phenylene ether) phase.

In a very specific embodiment of the poly(phenylene ether)-poly(hydroxy ether)-poly(phenylene ether) triblock copolymer, each poly(phenylene ether) block independently comprises 2,6-dimethyl-1,4-phenylene ether units, 2,3,6-trimethyl-1,4-phenylene ether units, or a combination thereof; each poly(phenylene ether) block independently has a number average molecular weight of 1000 to 5000 atomic mass units; the poly(hydroxy ether) block has the structure

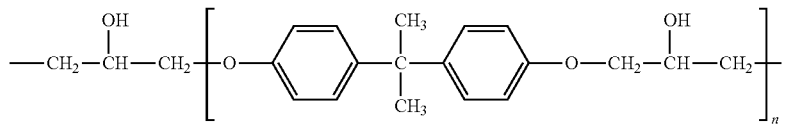

wherein n is 5 to 50; and the poly(phenylene ether)-poly(hydroxy ether)-poly(phenylene ether) triblock copolymer exhibits a first glass transition temperature of 95 to 115° C. and a second glass transition temperature of 170 to 200° C. In this embodiment, the poly(phenylene ether)-poly(hydroxy ether)-poly(phenylene ether) triblock copolymer can, optionally, comprise a poly(phenylene ether) content of 30 to 70 weight percent, specifically 40 to 60 weight percent, based on the weight of the poly(phenylene ether)-poly(hydroxy ether)-poly(phenylene ether) triblock copolymer.

Method of Forming Triblock Copolymer

One embodiment is a method of forming a poly(phenylene ether)-poly(hydroxy ether)-poly(phenylene ether) triblock copolymer, comprising: reacting a monohydroxy-terminated poly(phenylene ether) with a diepoxy-terminated poly(hydroxy ether) in the presence of a base.

The monohydroxy-terminated poly(phenylene ether) has the structure

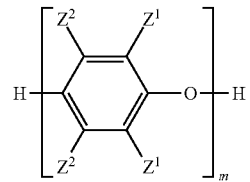

wherein m is 5 to 50; each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

All of the structural variations of the poly(phenylene ether) block described above apply as well to the monohydroxy-terminated poly(phenylene ether) that is the precursor to the poly(phenylene ether) block. For example, in some embodiments, the number of phenylene ether repeat units, m, in the monohydroxy-terminated poly(phenylene ether) is 10 to 40, specifically 10 to 30.

In some embodiments, the monohydroxy-terminated poly(phenylene ether) has a number average molecular weight of 1000 to 5000 atomic mass units.

In some embodiments, the monohydroxy-terminated poly(phenylene ether) comprises 2,6-dimethyl-1,4-phenylene ether units, 2,3,6-trimethyl-1,4-phenylene ether units, or a combination thereof. In these embodiments, the monohydroxy-terminated poly(phenylene ether) comprises phenylene ether units in which each occurrence of $Z^1$ is methyl, one occurrence of $Z^2$ is hydrogen, and the other occurrence of $Z^2$ is hydrogen or methyl.

In some embodiments, the monohydroxy-terminated poly (phenylene ether) has the structure

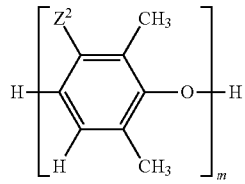

wherein m is 10 to 40, and each occurrence of $Z^2$ is independently hydrogen or methyl.

The monohydroxy-terminated poly(phenylene ether) is reacted with a diepoxy-terminated poly(hydroxy ether). The diepoxy-terminated poly(hydroxy ether) has the structure

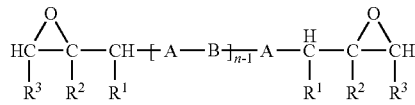

wherein A is a residue of structure

wherein each $G^1$ is independently at each occurrence a $C_6$-$C_{20}$ aromatic radical, and E is independently at each occurrence a direct bond, or a structure selected from the group consisting of

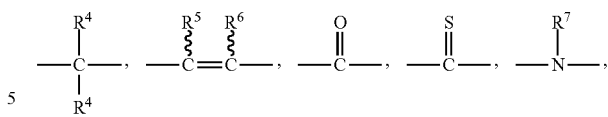

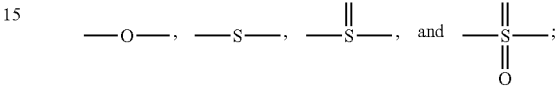

wherein each occurrence of $R^4$-$R^7$ is independently hydrogen or $C_1$-$C_{12}$ hydrocarbyl, s is 0 or 1, and t and u are each independently 1 to 10; and wherein B is a residue of structure

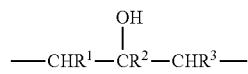

wherein $R^1$ to $R^3$ are each independently hydrogen, or $C_1$-$C_{12}$ hydrocarbyl; and wherein n is 2 to 60. Within the range of 2 to 60, the number of hydroxy ether repeat units, n, in the poly (hydroxy ether) block can be 5 to 50, specifically 10 to 30.

In some embodiments, the diepoxy-terminated poly(hydroxy ether) has a number average molecular weight of 2,000 to 10,000 atomic mass units, specifically 3000 to 7000 atomic mass units.

In some embodiments, the diepoxy-terminated poly(hydroxy ether) has the structure

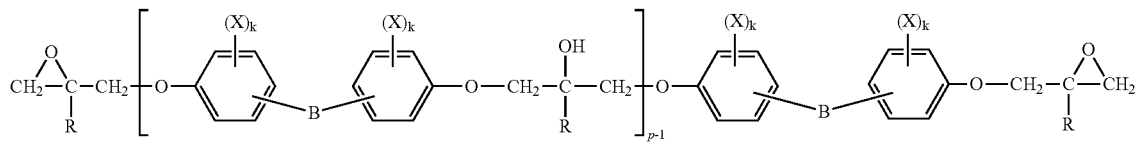

wherein each occurrence of R is independently hydrogen or methyl; each occurrence of k is independently 0, 1, 2, 3, or 4; each occurrence of X is independently chloro, fluoro, bromo, $C_1$-$C_{18}$ is hydrocarbyl optionally further comprising a member or members selected from carboxy, carboxamide, ketone, aldehyde, alcohol, halogen, and nitrile; each occurrence of B is independently a carbon-carbon single bond, $C_1$-$C_{18}$ hydrocarbyl, carbonyl, sulfide, sulfonyl, sulfinyl, phosphoryl, or silane; and p is independently 2 to 20.

In some embodiments, the diepoxy-terminated poly(hydroxy ether) has the structure

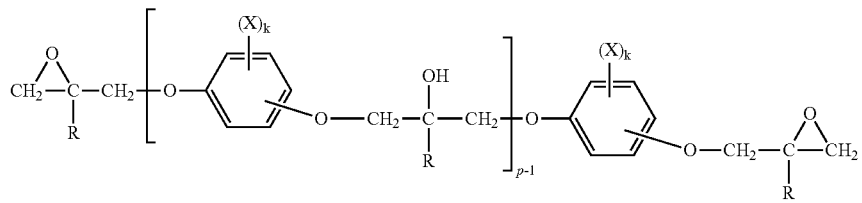

wherein R, X, k, and p are as defined above.

In some embodiments, the diepoxy-terminated poly(hydroxy ether) has the structure

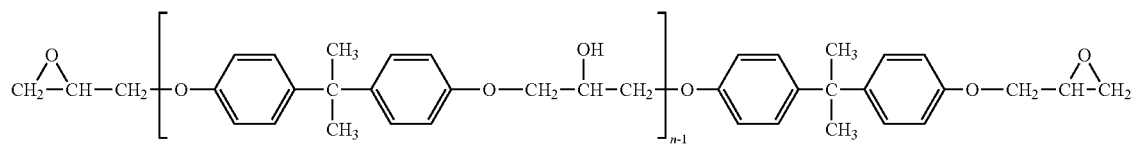

wherein n is 2 to 60, specifically 5 to 50, more specifically 10 to 30.

The reaction of the monohydroxy-terminated poly(phenylene ether) with the diepoxy-terminated poly(hydroxy ether) is conducted in the presence of a base. Suitable bases include tertiary amines, such as triethylamine, tri-n-propylamine, tri-n-butylamine, dimethylaniline, diethylaniline, alpha-methylbenzyldimethylamine, N,N-dimethylaminoethanol, N,N-dimethylaminopyridine (DMAP), alkylimidazoles, and mixtures thereof. A specific tertiary amine catalyst is N,N-dimethylaminopyridine (DMAP).

The reaction can be conducted in the presence of a solvent selected from the group consisting of aromatic hydrocarbons, chlorinated hydrocarbons, and polar aprotic solvents. Suitable polar aprotic solvents are ketones, esters, ethers, amides, nitriles, sulfoxides, sulfones, and mixtures thereof. In some embodiments, the solvent is cyclohexanone.

In some embodiments, the diepoxy-terminated poly(hydroxy ether) is added to the monohydroxy-terminated poly (phenylene ether) in portions over 15 to 300 minutes, specifically 80 to 180 minutes. After addition of the epoxy resin to the poly(phenylene ether) is complete, the mixture can be stirred for 1 to 12 hours, specifically 4 to 10 hours, at the reaction temperature. The reaction can be conducted at a temperature of 100 to 200° C., specifically 120 to 180° C., more specifically 120 to 160° C.

Upon completion of the reaction, the reaction mixture is cooled, and diluted with a co-solvent selected from the group consisting of aromatic hydrocarbons, chlorinated hydrocarbons, and polar aprotic solvents. In some embodiments, the co-solvent is 2-butanone. After dilution of the reaction mixture with the co-solvent, an anti-solvent is added to effect precipitation of the poly(phenylene ether)-poly(hydroxy ether)-poly(phenylene ether) triblock copolymer. The co-solvent can be an alcohol. Suitable alcohols include methanol and isopropanol. After precipitation, the product can be filtered, washed with anti-solvent, and dried under vacuum to afford the poly(phenylene ether)-poly(hydroxy ether)-poly (phenylene ether) triblock copolymer.

In a particular embodiment of the reaction, the monohydroxy-terminated poly(phenylene ether) has the structure

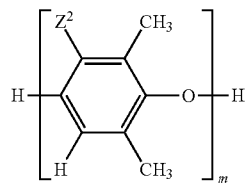

wherein m is 10 to 40, and each occurrence of $Z^2$ is independently hydrogen or methyl; the diepoxy-terminated poly(hydroxy ether) has the structure

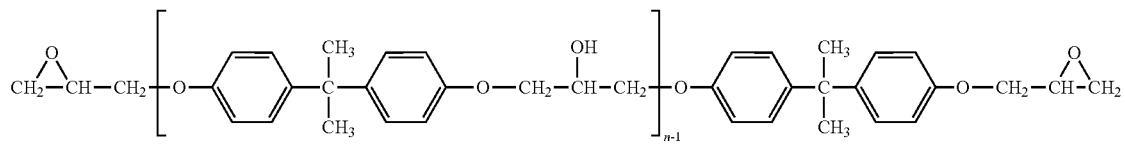

wherein n is 5 to 50; and the base is N,N-dimethylaminopyridine.

Compatibilized Composition Comprising Polar and Non-Polar Polymers

One embodiment is a composition in which the poly(phenylene ether)-poly(hydroxy ether)-poly(phenylene ether) triblock copolymer compatibilizes a polar polymer and a non-polar polymer. Specifically, the composition can comprise, based on the total weight of the composition: 30 to 93 weight percent of a polar polymer selected from the group consisting of cellulose esters, poly(alkyl(meth)acrylate)s, polyamides, polycarbonates, polyesters, polyetherimides, polysulfones, polyethersulfones, poly(ethylene-ethyl acrylate)s, poly(ethylene-vinyl acetate)s, polyurethanes, poly(vinyl acetate)s, poly(vinyl alcohol)s, poly(styrene-acrylonitrile)s, poly(styrene-maleic anhydride)s, poly(vinyl butyral)s, and combinations thereof; 5 to 68 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof; and 2 to 20 weight percent of a poly(phenylene ether)-poly(hydroxy ether)-poly(phenylene ether) triblock copolymer.

The polar polymer can be a cellulose ester. Cellulose esters include, for example, cellulose acetate, cellulose propionate, cellulose butyrate, cellulose acetate propionate, cellulose acetate butyrate, cellulose triacetate, and combinations thereof. In some embodiments, the cellulose ester comprises cellulose acetate, cellulose propionate, or a combination thereof. Cellulose esters can be prepared by reaction of cellulose with the corresponding anhydride (e.g., cellulose acetate by reaction of cellulose with acetic anhydride) in the presence of sulfuric acid. Commercially available cellulose esters include cellulose acetates from Celanese and Eastman Chemical, and cellulose acetate butyrate from Eastman Chemical.

The polar polymer can be a poly(alkyl(meth)acrylate). As used herein, the term "(meth)acrylate" encompasses both acrylate and methacrylate. Poly(alkyl(meth)acrylate)s include, for example, poly(methyl acrylate), poly(methyl methacrylate), poly(ethyl acrylate), poly(ethyl methacrylate), poly(n-propyl acrylate), poly(n-propyl methacrylate), poly(iso-propyl acrylate), poly(iso-propyl methacrylate), poly(n-butyl acrylate), poly(n-butyl methacrylate), poly(iso-butyl acrylate), poly(iso-butyl methacrylate), and combinations thereof. In some embodiments, the poly(alkyl(meth)acrylate) comprises poly(methyl methacrylate). Poly(alkyl(meth)acrylate)s can be formed by radical polymerization of the corresponding alkyl(meth)acrylates. Commercially available poly(alkyl(meth)acrylate)s include the poly(methyl methacrylate)s sold by Lucite International under the trade names LUCITE™ and PERSPEX™, and by Altuglas International under the trade name PLEXIGLAS™.

The polar polymer can be a polyamide. Polyamides include, for example, polyamide-6, polyamide-6,6, polyamide-4, polyamide-4,6, polyamide-12, polyamide-6,10, polyamide-6,9, polyamide-6,12, amorphous polyamides, polyamide-6/6T, polyamide-6,6/6T, polyamide-9T, and combinations thereof. In some embodiments, the polyamide comprises a polyamide-6. In some embodiments, the polyamide comprises a polyamide-6,6. In some embodiments, the polyamide comprises a polyamide-6 and a polyamide-6,6. Polyamides can be formed by polycondensation of amino acids, or by ring-opening polymerization of lactams. Commercially available polyamides include the polyamide-6 and polyamide-6,6 sold by SABIC Innovative Plastics under the trade names AVP and ESPREE, the polyamide-6 and polyamide-6,6 sold by Asahi Kasei Plastics North America Inc. under the trade name THERYLON, and the polyamide-6 and polyamide-6,6 sold by BASF under the trade name ULTRAMID.

The polar polymer can be a polycarbonate. Polycarbonates have repeating structural carbonate units of the formula

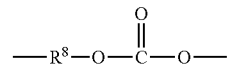

in which at least 60 percent of the total number of $R^8$ groups contain aromatic moieties and the balance thereof are aliphatic, alicyclic, or aromatic. In some embodiments, each $R^8$ is a $C_{6-30}$ aromatic group, that is, contains at least one aromatic moiety. $R^8$ can be derived from a dihydroxy compound such as, for example, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, catechol, hydroquinone, 2-methylhydroquinone, 2-ethylhydroquinone, 2-propylhydroquinone, 2-butylhydroquinone, 2-t-butylhydroquinone, 2-phenylhydroquinone, 2-cumylhydroquinone, 2,3,5,6-tetramethylhydroquinone, 2,3,5,6-tetra-t-butylhydroquinone, 2,3,5,6-tetrafluorohydroquinone, 2,3,5,6-tetrabromohydroquinone, and combinations thereof. In some embodiments the dihydroxy compound comprises 2,2-bis(4-hydroxyphenyl) propane. Polycarbonates can be formed by reaction of the dihydroxy compound with a carbonate precursor, such as phosgene or a diaryl carbonate (e.g., diphenyl carbonate).

Commercially available polycarbonates include those sold by SABIC Innovative Plastics under the trade name LEXAN™ resin, those sold by Bayer MaterialScience under the trade name APEC™, and those sold by Chemtura under the trade name BLENDEX™.

The polar polymer can be a polyester. Polyesters include, for example, poly(ethylene terephthalate), poly(propylene terephthalate), poly(butylene terephthalate), poly(cyclohexanedimethylene terephthalate), poly(ethylene naphthalate), poly(propylene naphthalate), poly(butylene naphthalate), poly(ethylene isophthalate/terephthalate), poly(propylene isophthalate/terephthalate), poly(butylene isophthalate/terephthalate), poly(ethylene terephthalate/naphthalate), poly(propylene terephthalate/naphthalate), poly(butylene terephthalate/naphthalate), polycaprolactone, polylactic acid, and combinations thereof. In some embodiments, the polyester comprises poly(ethylene terephthalate). In some embodiments, the polyester comprises poly(butylene terephthalate). In some embodiments, the polyester comprises polycaprolactone. In some embodiments, the polyester comprises poly(lactic acid). Polyesters can be formed by copolymerization of dialcohols and diacids, by polycondensation of hydroxy acids, or by ring-opening polymerization of lactones. Commercially polyesters include the poly(butylene terephthalate)s sold by SABIC Innovative Plastics under the trade name VALOX™ resin, the poly(butylene terephthalate)s sold by DuPont Performance Polymers under the trade name CRASTIN™, the poly(ethylene terephthalate)s sold by DuPont Packaging & Industrial Polymers under the trade name MYLAR™, the polycaprolactones sold by DURECT under the trade name LACTEL™, and the poly(lactic acid)s sold by NatureWorks LLC under the trade name INGEO™.

In some embodiments, the polar polymer comprises the polyester, and the polyester is selected from the group consisting of poly(ethylene terephthalate)s, poly(trimethylene terephthalate)s, poly(butylene terephthalate)s, polycaprolactones, poly(lactic acid)s, poly(butylene adipate)s, poly(butylene succinate)s, poly(butylene sebacate)s, and combinations thereof.

The polar polymer can be a polyetherimide. Polyetherimides are polymers having a repeat unit comprising at least one ether group and at least one imide group. Polyetherimides can be formed by the polycondensation reaction of a dianhydride with a diamine. For example, when the dianhydride is 2,2-bis(4-(3,4-dicarboxyphenoxy)phenyl)propane dianhydride and the diamine is meta-phenylenediamine, the polyetherimide-forming reaction can be expressed as

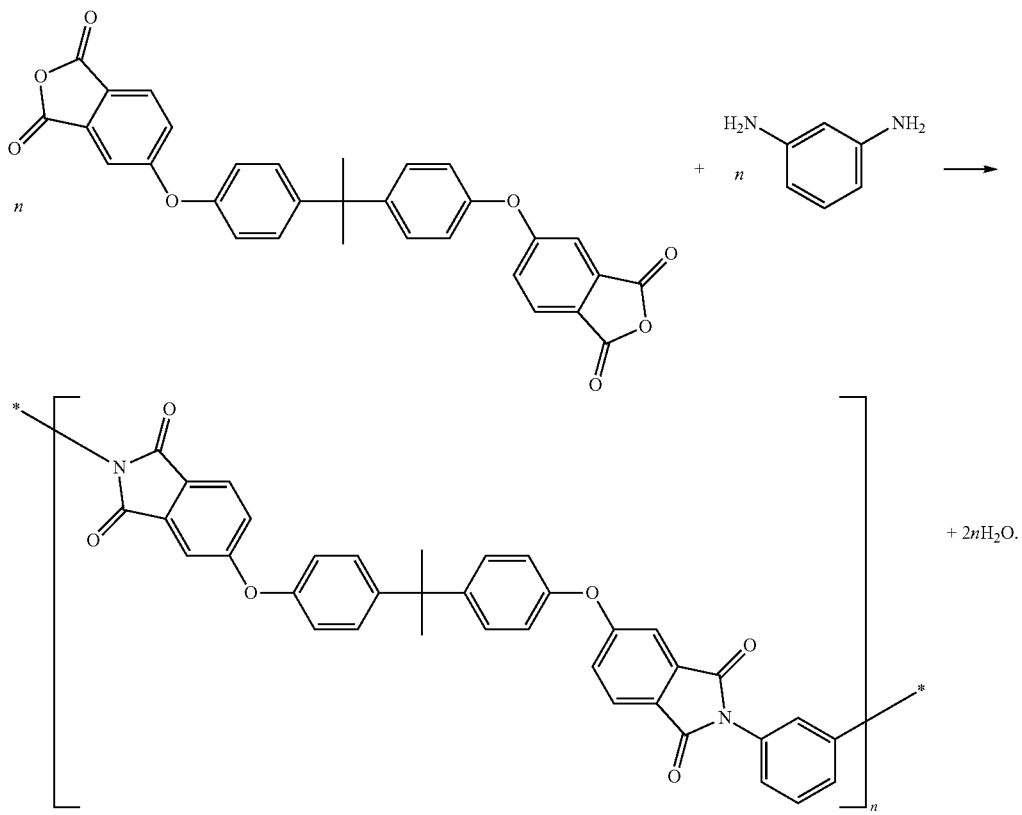

Suitable dianhydrides include, for example, 3,3-bis[4-(3,4-dicarboxyphenoxy)phenyl]propane dianhydride, 4,4'-bis(3,4-dicarboxyphenoxy)diphenyl ether dianhydride, 4,4'-bis(3,4-dicarboxyphenoxy)diphenyl sulfide dianhydride, 4,4'-bis(3,4-dicarboxyphenoxy)benzophenone dianhydride, 4,4'-bis(3,4-dicarboxyphenoxy)diphenyl sulfone dianhydride, 2,2-bis[4-(2,3-dicarboxyphenoxy)phenyl]propane dianhydride, 4,4'-bis(2,3-dicarboxyphenoxy)diphenyl ether dianhydride, 4,4'-bis(2,3-dicarboxyphenoxy)diphenyl sulfide dianhydride, 4,4'-bis(2,3-dicarboxyphenoxy)benzophenone dianhydride, 4,4'-bis(2,3-dicarboxyphenoxy)diphenyl sulfone dianhydride, 4-(2,3-dicarboxyphenoxy)-4'-(3,4-dicarboxyphenoxy)diphenyl-2,2-propane dianhydride, 4-(2,3-dicarboxyphenoxy)-4'-(3,4-dicarboxyphenoxy)diphenyl ether dianhydride, 4-(2,3-dicarboxyphenoxy)-4'-(3,4-dicarboxyphenoxy)diphenyl sulfide dianhydride, 4-(2,3-dicarboxyphenoxy)-4'-(3,4-dicarboxyphenoxy)benzophenone dianhydride, 4-(2,3-dicarboxyphenoxy)-4'-(3,4-dicarboxyphenoxy)diphenyl sulfone dianhydride, and combinations thereof. Suitable diamines include, for example, ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(p-amino-t-butyl)toluene, bis (p-amino-t-butylphenyl)ether, bis(p-methyl-o-aminophenyl) benzene, bis(p-methyl-o-aminopentyl)benzene, 1,3-diamino-4-isopropylbenzene, bis(4-aminophenyl)sulfide, bis-(4-aminophenyl)sulfone, bis(4-aminophenyl)ether, and combinations thereof. In some embodiments, the dianhydride comprises 2,2-bis(4-(3,4-dicarboxyphenoxy)phenyl)propane dianhydride and the diamine comprises meta-phenylenediamine. In some embodiments, the polyetherimide comprises poly(2,2'-bis(4-(3,4-dicarboxyphenoxy)phenylpropane)-1,3-phenylene bisimide) (CAS Reg. No. 61128-46-9). Commercially available polyetherimides include, for example, those from SABIC Innovative Plastics under the trade names EXTEM™ resin and ULTEM™ resin, those from Saint Gobain Performance Plastics under the trade name MELDIN™, and those from PolyOne Corporation under the trade name EDGETEK™.

The polar polymer can be a polysulfone. Polysulfones can be formed by the reaction of a dihydroxy compound with a bis(halophenyl)sulfone in the presence of base. For example, when the dihydroxy compound is bisphenol A (2,2-bis(4-hydroxyphenyl)propane), the bis(halophenyl)sulfone is 4,4'-dichlorodiphenylsulfone, and the base is sodium carbonate, the polysulfone-forming reaction can be expressed as

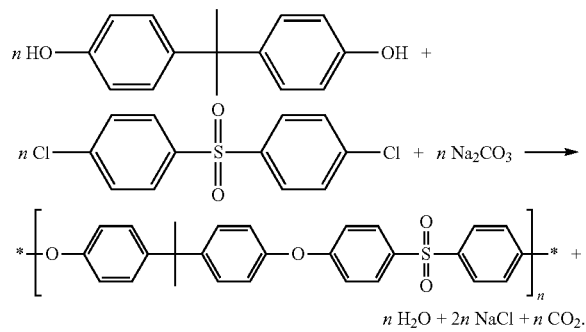

Suitable dihydroxy compounds include those described above in the context of the polycarbonates, as well as 1,4-dihydroxybenzene, 1,3-dihydroxybenzene, 4,4'-biphenol, 3,3'-biphenol, 3,4'-biphenol, and combinations thereof. Suitable bis(halophenyl)sulfones include 4,4'-difluorodiphenylsulfone, 4,4'-dichlorodiphenylsulfone, 4,4'-dibromodiphenylsulfone, 3,4'-difluorodiphenylsulfone, 3,4'-dichlorodiphenylsulfone, 3,4'-dibromodiphenylsulfone, 3,3'-difluorodiphenylsulfone, 3,3'-dichlorodiphenylsulfone, 3,3'-dibromodiphenylsulfone, and combinations thereof. In some embodiments, the dihydroxy compound is bisphenol A (2,2-bis(4-hydroxyphenyl)propane), and the bis(halophenyl)sulfone is 4,4'-dichlorodiphenylsulfone. In some embodiments, the dihydroxy compound is 4,4'-sulfonyldiphenol, and the bis(halophenyl)sulfone is 4,4'-dichlorodiphenylsulfone. Commercially available polysulfones include, for example, those from SABIC Innovative Plastics under the trade name LNP THERMOCOMP™ compound, those from BASF under the trade name ULTRASON™, and those from Sumitomo under the trade names SUMIKAEXCEL™ and SUMIPLOY™.

The polar polymer can be a polyethersulfone. Polyethersulfones are polymers having repeating units of the structure

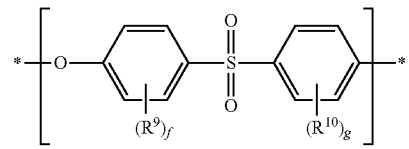

wherein f and g are each independently 0-4, and each occurrence of $R^9$ and $R^{10}$ is independently halogen or $C_1$-$C_6$ alkyl. In some embodiments, the polyethersulfone comprises repeating units of the structure

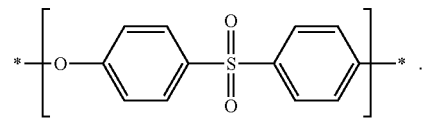

Polyethersulfones can be prepared by the reaction of a bis(hydroxyphenyl)sulfone the with a bis(halophenyl)sulfone in the presence of base. Commercially available polyethersulfones include, for example, those from Port Plastics under the trade name UDEL™.

The polar polymer can be a poly(ethylene-ethyl acrylate). Poly(ethylene-ethyl acrylate) (CAS Reg. No. 9010-86-0) is a random copolymer of ethylene and ethyl acrylate. In some embodiments, the ethylene content of the poly(ethylene-ethyl acrylate) is 70 to 98 weight percent, specifically 80 to 95 weight percent, with the balance being ethyl acrylate content. Poly(ethylene-ethyl acrylate) can be prepared by radical copolymerization of ethylene and ethyl acrylate. Commercially available poly(ethylene-ethyl acrylate)s include those from Dow under the trade name AMPLIFY™, from Arkema under the trade name LOTADER™, and from DuPont under the trade name ELVALOY™.

The polar polymer can be a poly(ethylene-vinyl acetate). Poly(ethylene-vinyl acetate) (CAS Reg. No. 24937-78-8) is a random copolymer of ethylene and vinyl acetate. In some embodiments, the vinyl acetate content of the poly(ethylene-vinyl acetate) is 8 to 60 weight percent, specifically 10 to 50 weight percent, more specifically 15 to 40 weight percent, still more specifically 20 to 30, with the balance being ethylene content. Poly(ethylene-vinyl acetate) can be prepared by radical copolymerization of ethylene and vinyl acetate. Commercially available poly(ethylene-vinyl acetate)s include those from DuPont under the trade name ELVAX™, from Arkema under the trade name EVATANE™, and from LyondellBasell under the trade name ULTRATHENE™.

The polar polymer can be a polyurethane, also known as thermoplastic polyurethane. Polyurethanes are formed by the reaction of a diisocyanate with a long chain diol (sometimes referred to as a "polyol"). For example, when the diisocyanate is diphenylmethane-4,4'-diisocyanate and the long chain diol is polyethylene glycol, the polyurethane-forming reaction can be expressed as

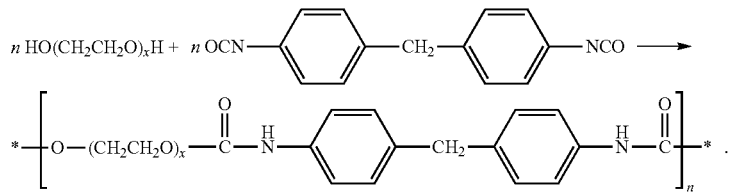

Suitable diisocyanates include, for example, 1,2-phenylene diisocyanate, 1,3-phenylene diisocyanate, 1,4-phenylene diisocyanate, 1,4-naphthalene diisocyanate, 1,5-naphthalene diisocyanate, 4,4'-diphenyl ether diisocyanate, 2,4-toluene diisocyanate, 2,6-toluene diisocyanate, 2,2'-diphenylmethane diisocyanate, 2,4'-diphenylmethane diisocyanate, 4,4'-diphenylmethane diisocyanate, isophorone diisocyanate, and combinations thereof. Long chain diols most commonly fall into three classes: polyether diols, polyester diols, and polybutadiene diols. Polyether diols include, for example, polyethylene glycols, polypropylene glycols, polybutylene glycols, ethylene oxide-capped poly(oxypropylene)diols and polyols, alkoxylated bisphenols (such as ethoxylated bisphenol A and propoxylated bisphenol A), and combinations thereof. Polyester diols, which can be prepared by diol-initiated polymerization of a lactone, include, for example, polycaprolactone diols, poly(ethylene adipate)diols, poly(propylene adipate)diols, poly(butylene adipate)diols, ortho-phthalic polyester polyols, terephthalic polyester polyols, and combinations thereof. Polybutadiene diols are linear polybutadienes with a hydroxy group at each end. In some embodiments, the long chain diol has a number average molecular weight of 500 to 10,000 atomic mass units, specifically 1,000 to 5,000 atomic mass units. In addition to the diisocyanate and the long chain diol, the reactants used to form the polyurethane can further include a short chain diol sometimes referred to as a chain extender. Suitable short chain diols include, for example, ethylene glycol, propylene glycol, diethylene glycol, 1,4-butanediol, and combinations thereof. Commercially available polyurethanes include those from Huntsman under the trade name IROGRAN™, from Bayer Material Science under the trade names DESMOPAN™ and TEXIN™, from Lubrizol under the trade name PELLETHANE™, and from Great Eastern Resins Industrial Co., Ltd. under the trade name ISOTHANE™, and from BASF under the trade name ELASTOLLAN™.

The polar polymer can be a poly(vinyl acetate). Poly(vinyl acetate) (CAS Reg. No. 9003-20-7) is a homopolymer of vinyl acetate. Poly(ethylene-vinyl acetate) can be prepared by radical polymerization of vinyl acetate. Commercially available poly(vinyl acetate)s include those from ACHEMA, from Wacker under the trade name VINNAPAS™ and from Solutia under the trade name GELVA™.

The polar polymer can be a poly(vinyl alcohol). Poly(vinyl alcohol) (CAS Reg. No. 9002-89-5) is a homopolymer of vinyl alcohol. Poly(vinyl alcohol) can be prepared by radical polymerization of vinyl alcohol, which exists largely in its tautomeric form, acetaldehyde. Commercially available poly(vinyl alcohol)s include those from Denka under the trade name POVAL™, from MonoSol LLC under the trade name MONOSOL™, and from Sekisui Chemical Company, Ltd. under the trade name CELVOL™.

The polar polymer can be a poly(styrene-acrylonitrile). Poly(styrene-acrylonitrile) (CAS Reg. No. 9003-54-7) is a random copolymer of styrene and acrylonitrile. In some embodiments, the styrene content of the poly(styrene-acrylonitrile) is 60 to 90 weight percent, specifically 70 to 80 weight percent, with the balance being acrylonitrile content. Poly(styrene-acrylonitrile) can be prepared by radical copolymerization of styrene and acrylonitrile. Commercially available poly(styrene-acrylonitrile)s include those from Chemtura under the trade name BLENDEX™, from Ferro under the trade name STYVEX™, and from SABIC Innovative Plastics under the trade names ESPREE™ resin, LNP LUBRICOMP™ compound and LNP THERMOCOMP™ compound.

The polar polymer can be a poly(styrene-maleic anhydride). Poly(styrene-maleic anhydride) (CAS Reg. No. 9011-13-6) is a random copolymer of styrene and maleic anhydride. In some embodiments, the styrene content of the poly(styrene-maleic anhydride) is 3 to 25 weight percent, specifically 5 to 15 weight percent, with the balance being maleic anhydride content. Poly(styrene-maleic anhydride) can be prepared by radical copolymerization of styrene and maleic anhydride. Commercially available poly(styrene-maleic anhydride)s include those from INEOS ABS under the trade name LUSTRAN™, and from Polyscope Polymers BV under the trade name XIRAN™.

The polar polymer can be a poly(vinyl butyral). Poly(vinyl butyral) (CAS Reg. No. 9001-13-6). Poly(vinyl butyral) is prepared by reaction of poly(vinyl alcohol) with butyraldehyde. Commercially available poly(vinyl butyral)s include those available from DuPont under the trade name BUTACITE™, from Solutia under the trade name SAFLEX™ and from Kuraray under the trade name TROSIFOL™.

There is no particular limit on the molecular weight or melt viscosity of the polar polymer. A skilled person can select a polar polymer molecular weight or melt viscosity based on factors including the desired use (e.g., molding conditions), and intermolecular interactions of the polar polymer with itself.

In some embodiments, the polar polymer is the polyester, optionally in combination with one or more of cellulose esters, poly(alkyl(meth)acrylate)s, polyamides, polycarbonates, polyetherimides, polysulfones, polyethersulfones, poly(ethylene-ethyl acrylate)s, poly(ethylene-vinyl acetate)s, polyurethanes, poly(vinyl acetate)s, poly(vinyl alcohol)s, poly(styrene-acrylonitrile)s, poly(styrene-maleic anhydride)s, and poly(vinyl butyral)s.

In some embodiments, the polar polymer is the polyamide, optionally in combination with one or more of cellulose esters, poly(alkyl(meth)acrylate)s, polyesters, polycarbonates, polyetherimides, polysulfones, polyethersulfones, poly(ethylene-ethyl acrylate)s, poly(ethylene-vinyl acetate)s, polyurethanes, poly(vinyl acetate)s, poly(vinyl alcohol)s, poly(styrene-acrylonitrile)s, poly(styrene-maleic anhydride)s, and poly(vinyl butyral)s.

The polar polymer can be used in an amount of 30 to 93 weight percent, based on the weight of the composition. Within this range, the polar polymer amount can be 40 to 86 weight percent, specifically 45 to 74 weight percent, more specifically 50 to 64 weight percent, even more specifically 50 to 54 weight percent.

In addition to the polar polymer, the composition comprises a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof.

The non-polar polymer can be an unhydrogenated block copolymer of an alkenyl aromatic compound and a conjugated diene. For brevity, this component is referred to as an "unhydrogenated block copolymer". The unhydrogenated block copolymer can comprise 10 to 90 weight percent of poly(alkenyl aromatic) content and 90 to 10 weight percent of poly(conjugated diene) content, based on the weight of the unhydrogenated block copolymer. In some embodiments, the unhydrogenated block copolymer is a low poly(alkenyl aromatic content) unhydrogenated block copolymer in which the poly(alkenyl aromatic) content is 10 to less than 40 weight percent, specifically 20 to 35 weight percent, more specifically 25 to 35 weight percent, yet more specifically 30 to 35 weight percent, all based on the weight of the low poly(alkenyl aromatic) content unhydrogenated block copolymer. In other embodiments, the unhydrogenated block copolymer is a high poly(alkenyl aromatic) content unhydrogenated block copolymer in which the poly(alkenyl aromatic) content is 40 to 90 weight percent, specifically 50 to 80 weight percent, more specifically 60 to 70 weight percent, all based on the weight of the high poly(alkenyl aromatic) content unhydrogenated block copolymer.

In some embodiments, the unhydrogenated block copolymer has a weight average molecular weight of 40,000 to 400,000 atomic mass units. The number average molecular weight and the weight average molecular weight can be determined by gel permeation chromatography and based on comparison to polystyrene standards. In some embodiments, the unhydrogenated block copolymer has a weight average molecular weight of 200,000 to 400,000 atomic mass units, specifically 220,000 to 350,000 atomic mass units. In other embodiments, the unhydrogenated block copolymer has a weight average molecular weight of 40,000 to 200,000 atomic mass units, specifically 40,000 to 180,000 atomic mass units, more specifically 40,000 to 150,000 atomic mass units.

The alkenyl aromatic monomer used to prepare the unhydrogenated block copolymer can have the structure

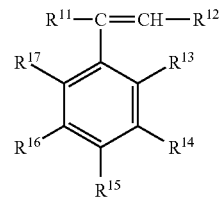

wherein $R^{11}$ and $R^{12}$ each independently represent a hydrogen atom, a $C_1$-$C_8$ alkyl group, or a $C_2$-$C_8$ alkenyl group; $R^{13}$ and $R^{17}$ each independently represent a hydrogen atom, a $C_1$-$C_8$ alkyl group, a chlorine atom, or a bromine atom; and $R^{14}$, $R^{15}$, and $R^{16}$ each independently represent a hydrogen atom, a $C_1$-$C_8$ alkyl group, or a $C_2$-$C_8$ alkenyl group, or $R^{14}$ and $R^{15}$ are taken together with the central aromatic ring to form a naphthyl group, or $R^{15}$ and $R^{16}$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the unhydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and combinations thereof. In some embodiments, the conjugated diene is 1,3-butadiene, 2-methyl-1,3-butadiene, or a combination thereof. In some embodiments, the conjugated diene consists of 1,3-butadiene.

The unhydrogenated block copolymer is a copolymer comprising (A) at least one block derived from an alkenyl aromatic compound and (B) at least one block derived from a conjugated diene. The arrangement of blocks (A) and (B) includes a linear structure, a grafted structure, and a radial teleblock structure with or without a branched chain. Linear block copolymers include tapered linear structures and non-tapered linear structures. In some embodiments, the unhydrogenated block copolymer has a tapered linear structure. In some embodiments, the unhydrogenated block copolymer has a non-tapered linear structure. In some embodiments, the unhydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the unhydrogenated block copolymer is a diblock copolymer, a triblock copolymer, or a combination thereof.

In some embodiments, the unhydrogenated block copolymer excludes the residue of monomers other than the alkenyl aromatic compound and the conjugated diene. In some embodiments, the unhydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms.

In some embodiments, the unhydrogenated block copolymer includes the residue of one or more acid functionalizing agents, such as maleic anhydride.

In some embodiments, the unhydrogenated block copolymer comprises a polystyrene-polybutadiene-polystyrene triblock copolymer. In some embodiments, the unhydrogenated block copolymer comprises a polystyrene-polyisoprene-polystyrene triblock copolymer.

Methods for preparing unhydrogenated block copolymers are known in the art and unhydrogenated block copolymers are commercially available. Illustrative commercially available unhydrogenated block copolymers include the polystyrene-polybutadiene-polystyrene triblock copolymers from Kraton Performance Polymers Inc. under the trade names D1101™ and D1102™; and the styrene-butadiene radial teleblock copolymers from Chevron Phillips Chemical Company under the trade names K-RESIN KR01™, KR03™, and KR-05™.

The non-polar polymer can be a hydrogenated block copolymer of an alkenyl aromatic compound and a conjugated diene. For brevity, this component is referred to as a "hydrogenated block copolymer". The hydrogenated block copolymer is the same as the unhydrogenated block copolymer, except that in the hydrogenated block copolymer the aliphatic unsaturated group content in the block (B) derived from a conjugated diene is at least partially reduced by hydrogenation. In some embodiments, the aliphatic unsaturation in the (B) block is reduced by at least 50 percent, specifically at least 70 percent, more specifically at least 90 percent.

Illustrative commercially available hydrogenated block copolymers include the polystyrene-poly(ethylene-propylene) diblock copolymers available from Kraton Performance Polymers Inc. as KRATON G1701™ and G1702™; the polystyrene-poly(ethylene-butylene)-polystyrene triblock copolymers available from Kraton Performance Polymers Inc. as KRATON G1641™, G1650™, G1651™, G1654™, G1657™, G1726™, G4609™, G4610™, GRP-6598™, MD-6932M™, MD-6933™, and MD-6939™; the polystyrene-poly(ethylene-propylene)-polystyrene triblock copolymers available from Kraton Performance Polymers Inc. as KRATON G1730™; the maleic anhydride-grafted polystyrene-poly(ethylene-butylene)-polystyrene triblock copolymers available from Kraton Performance Polymers Inc. as KRATON G1901™, G1924™, and MD-6684™; the maleic anhydride-grafted polystyrene-poly(ethylene-butylene-styrene)-polystyrene triblock copolymer available from Kraton Performance Polymers Inc. as KRATON MD-6670™; the polystyrene-poly(ethylene-butylene)-polystyrene triblock copolymer comprising 67 weight percent polystyrene available from Asahi Kasei Elastomer as TUFTEC H1043™; the polystyrene-poly(ethylene-butylene)-polystyrene triblock copolymer comprising 42 weight percent polystyrene available from Asahi Kasei Elastomer as TUFTEC H1051™; the polystyrene-poly(butadiene-butylene)-polystyrene triblock copolymers available from Asahi Kasei Elastomer as TUFTEC P1000™ and P2000™; the polystyrene-poly(ethylene-butylene)-polystyrene triblock copolymer comprising 60 weight polystyrene available from Kuraray as SEPTON S8104™; the polystyrene-poly(ethylene-ethylene/propylene)-polystyrene triblock copolymers available from Kuraray as SEPTON S4044™, S4055™, S4077™, and S4099™; and the polystyrene-poly(ethylene-propylene)-polystyrene triblock copolymer comprising 65 weight percent polystyrene available from Kuraray as SEPTON S2104™.

The non-polar polymer can be a poly(alkenyl aromatic). As used herein, the term "poly(alkenyl aromatic)" refers to a homopolymer of an alkenyl aromatic monomer, a copolymer of two or more alkenyl aromatic monomers, a rubber-modified derivative of one of the foregoing polymers, or a combination thereof. The alkenyl aromatic monomer is described above in the context of the unhydrogenated block copolymer. Representative poly(alkenyl aromatic)s include atactic polystyrenes, syndiotactic polystyrenes, isotactic polystyrenes, and rubber-modified polystyrenes. In some embodiments, the poly(alkenyl aromatic) comprises an atactic polystyrene. In some embodiments, the poly(alkenyl aromatic) comprises a rubber-modified polystyrene comprising 80 to 96 weight percent polystyrene content, specifically 88 to 94 weight percent polystyrene content; and 4 to 20 weight percent polybutadiene content, specifically 6 to 12 weight percent polybutadiene content, based on the weight of the rubber-modified polystyrene. In some embodiments, the poly(alkenyl aromatic) comprises an atactic polystyrene and a rubber-modified polystyrene. Commercially available poly(alkenyl aromatic)s include the atactic polystyrenes available as EA3130-AMST™ from Americas Styrenics LLC and as ESPREE™ CPS15GP resin from SABIC Innovative Plastics; the syndiotactic polystyrene available as EDTEK QT-30GF/000™ Natural from PolyOne Corporation; and the rubber-modified polystyrenes available as EB6400-AMST™ from Americas Styrenics LLC and as HIPS3190 from SABIC Innovative Plastics.

The non-polar polymer can be a poly(phenylene ether). Suitable poly(phenylene ether)s include those comprising repeating structural units having the formula

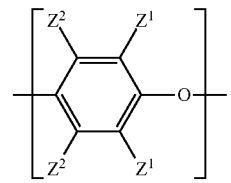

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxy groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

In some embodiments, the poly(phenylene ether) has an intrinsic viscosity of 0.25 to 1 deciliter per gram measured at 25° C. in chloroform. Within this range, the poly(phenylene ether) intrinsic viscosity can be 0.3 to 0.65 deciliter per gram, more specifically 0.35 to 0.5 deciliter per gram, even more specifically 0.4 to 0.5 deciliter per gram.

In some embodiments, the poly(phenylene ether) is essentially free of incorporated diphenoquinone residues. In the context, "essentially free" means that the fewer than 1 weight percent of poly(phenylene ether) molecules comprise the residue of a diphenoquinone. As described in U.S. Pat. No. 3,306,874 to Hay, synthesis of poly(phenylene ether) by oxidative polymerization of monohydric phenol yields not only the desired poly(phenylene ether) but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(phenylene ether) (i.e., the diphenoquinone is incorporated into the poly(phenylene ether) structure) by heating the polymerization reaction mixture to yield a poly (phenylene ether) comprising terminal or internal diphenoquinone residues). For example, when a poly(phenylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly(phenylene ether) with terminal and internal residues of incorporated diphenoquinone. However, such reequilibration reduces the molecular weight of the poly(phenylene ether). Accordingly, when a higher molecular weight poly(phenylene ether) is desired, it may be desirable to separate the diphenoquinone from the poly(phenylene ether) rather than reequilibrating the diphenoquinone into the poly(phenylene ether) chains. Such a separation can be achieved, for example, by precipitation of the poly(phenylene ether) in a solvent or solvent mixture in which the poly(phenylene ether) is insoluble and the diphenoquinone is soluble. For example, when a poly(phenylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with 1 to 4 volumes of methanol or a methanol/water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the reequilibration of the diphenoquinone into the poly(phenylene ether) chain can be minimized (e.g., by isolating the poly(phenylene ether) no more than 200 minutes after termination of oxidative polymerization). These approaches are described in International Patent Application Publication No. WO2009/104107 A1 of Delsman et al. In an alternative approach utilizing the temperature-dependent solubility of diphenoquinone in toluene, a toluene solution containing diphenoquinone and poly(phenylene ether) can be adjusted to a temperature of about 25° C., at which diphenoquinone is poorly soluble but the poly(phenylene ether) is soluble, and the insoluble diphenoquinone can be removed by solid-liquid separation (e.g., filtration).

In some embodiments, the poly(phenylene ether) comprises 2,6-dimethyl-1,4-phenylene ether units, 2,3,6-trimethyl-1,4-phenylene ether units, or a combination thereof. In some embodiments, the poly(phenylene ether) is a poly(2,6-dimethyl-1,4-phenylene ether). In some embodiments, the poly(phenylene ether) comprises a poly(2,6-dimethyl-1,4-phenylene ether) having an intrinsic viscosity of 0.35 to 0.5 deciliter per gram, specifically 0.35 to 0.46 deciliter per gram, measured at 25° C. in chloroform.

The poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer.

The poly(phenylene ether) can be prepared by oxidative polymerization of one or more monohydric phenols. Commercially available poly(phenylene ether)s include those from Asahi Kasei Chemicals Corporation under the trade name XYRON™, and from SABIC Innovative Plastics under the trade name PPO™ resin.

In some embodiments, the non-polar polymer is the poly (phenylene ether), optionally in combination with one or more of unhydrogenated block copolymers of alkenyl aromatic compounds and conjugated dienes, hydrogenated block copolymers of alkenyl aromatic compounds and conjugated dienes, and poly(alkenyl aromatic)s.

In some embodiments, the non-polar polymer is the poly (phenylene ether) and the poly(alkenyl aromatic), wherein the poly(alkenyl aromatic) is selected from the group consisting of polystyrenes, rubber-modified polystyrenes, and combinations thereof.

In some embodiments, the non-polar polymer is a combination of the poly(phenylene ether) and the poly(alkenyl aromatic), optionally further in combination with one or more of unhydrogenated block copolymers of alkenyl aromatic compounds and conjugated dienes, and hydrogenated block copolymers of alkenyl aromatic compounds and conjugated dienes.

In some embodiments, the non-polar polymer is a combination of the poly(phenylene ether) and the hydrogenated block copolymer of an alkenyl aromatic compound and a conjugated diene, optionally in further combination with one or more of unhydrogenated block copolymers of alkenyl aromatic compounds and conjugated dienes, and poly(alkenyl aromatic)s.

In some embodiments, the non-polar polymer is the poly (alkenyl aromatic), optionally in combination with one or more of unhydrogenated block copolymers of alkenyl aromatic compounds and conjugated dienes, hydrogenated block copolymers of alkenyl aromatic compounds and conjugated dienes, and poly(phenylene ether)s.

In some embodiments, the polar polymer comprises the polyester, wherein the polyester comprises a poly(butylene terephthalate); and the non-polar polymer comprises the poly (phenylene ether) and the hydrogenated block copolymer.

In some embodiments, the polar polymer comprises the polyester, wherein the polyester comprises a poly(lactic acid); and the non-polar polymer comprises the poly(phenylene ether) and the hydrogenated block copolymer.

In some embodiments, the polar polymer comprises the poly(ethylene-vinyl acetate); and the non-polar polymer comprises (a) the poly(phenylene ether), and (b) the unhydrogenated block copolymer, the hydrogenated block copolymer, or the combination thereof.

The composition comprises the non-polar polymer in an amount of 5 to 68 weight percent, based on the weight of the composition. Within this range, the non-polar polymer amount can be 10 to 65 weight percent, specifically 20 to 60 weight percent, more specifically 30 to 55 weight percent, even more specifically 40 to 50 weight percent.

In addition to the polar polymer and the non-polar polymer, the composition comprises a poly(phenylene ether)-poly(hydroxy ether)-poly(phenylene ether) triblock copolymer. Any of the above-described variations of the poly(phenylene ether)-poly(hydroxy ether)-poly(phenylene ether) triblock copolymer can be used. For example, in some embodiments, each poly(phenylene ether) block of the poly(phenylene ether)-poly(hydroxy ether)-poly(phenylene ether) triblock copolymer independently comprises 2,6-dimethyl-1,4-phenylene ether units, 2,3,6-trimethyl-1,4-phenylene ether units, or a combination thereof; each poly(phenylene ether) block of the poly(phenylene ether)-poly(hydroxy ether)-poly(phenylene ether) triblock copolymer independently has a number average molecular weight of 1000 to 5000 atomic mass units; the poly(hydroxy ether) block of the poly(phenylene ether)-poly(hydroxy ether)-poly(phenylene ether) triblock copolymer has the structure

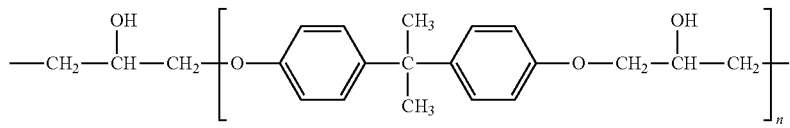

wherein n is 5 to 50; and the poly(phenylene ether)-poly(hydroxy ether)-poly(phenylene ether) triblock copolymer exhibits a first glass transition temperature of 95 to 115° C. and a second glass transition temperature of 170 to 220° C.

The composition comprises the poly(phenylene ether)-poly(hydroxy ether)-poly(phenylene ether) triblock copolymer in an amount of 2 to 20 weight percent, based on the total weight of the composition. Within this range, the triblock copolymer amount can be 4 to 15 weight percent, specifically 5 to 12 weight percent.

The composition can, optionally, further comprise a polar filler. As used herein, the term "polar filler" refers to a filler comprising a surface capable of an energetically favorable interaction with a poly(hydroxy ether) block of the poly(phenylene ether)-poly(hydroxy ether)-poly(phenylene ether) triblock copolymer. The energetically favorable interaction may include, for example, one or more of hydrogen bonding, dipole-dipole interactions, and London dispersion forces. As described in detail below, the poly(phenylene ether)-poly(hydroxy ether)-poly(phenylene ether) triblock copolymer compatibilizes non-polar polymers and polar fillers. Suitable polar fillers include glass fibers, glass flakes, glass beads (including hollow glass beads), clays, talcs, micas, silicas, aluminas, titanium dioxides, wollastonites, calcium carbonates, calcium sulfates, barium sulfates, dolomites (calcium magnesium carbonates), processed mineral fibers (i.e., man-made vitreous silicate fibers formed by the melt spinning of furnace slags and other minerals), metal oxides (including aluminum oxides, zinc oxides, nickel oxides, bronze oxides, and copper oxides), metal hydroxides (including aluminum hydroxides), ceramic fibers (including those sold as NEXTEL™ Ceramic Fiber by 3M, and as FIBERFRAX™ Refractory Ceramic Fiber by Unifrax LLC), and combinations thereof.

In a very specific embodiment of the composition, each poly(phenylene ether) block of the poly(phenylene ether)-poly(hydroxy ether)-poly(phenylene ether) triblock copolymer comprises 2,6-dimethyl-1,4-phenylene ether units; each poly(phenylene ether) block of the poly(phenylene ether)-poly(hydroxy ether)-poly(phenylene ether) triblock copolymer independently has a number average molecular weight of 1500 to 3500 atomic mass units; the poly(hydroxy ether) block of the poly(phenylene ether)-poly(hydroxy ether)-poly(phenylene ether) triblock copolymer has the structure

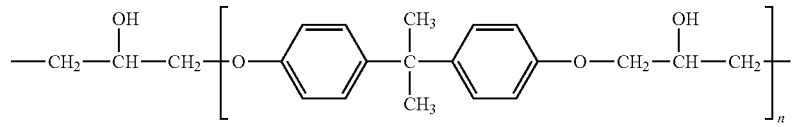

wherein n is 5 to 50; the poly(phenylene ether)-poly(hydroxy ether)-poly(phenylene ether) triblock copolymer exhibits a first glass transition temperature of 95 to 115° C. and a second glass transition temperature of 170 to 220° C.; the polar polymer comprises poly(ethylene terephthalate), poly(butylene terephthalate), or a combination thereof; and the non-polar polymer comprises a poly(phenylene ether), a poly(alkenyl aromatic), or a combination thereof. In this embodiment, the poly(phenylene ether)-poly(hydroxy ether)-poly(phenylene ether) triblock copolymer can, optionally, comprise a poly(phenylene ether) content of 30 to 70 weight percent, specifically 40 to 60 weight percent, based on the weight of the poly(phenylene ether)-poly(hydroxy ether)-poly(phenylene ether) triblock copolymer.

Compatibilized Composition Comprising Polar Filler and Non-Polar Polymer

Another specific embodiment is a composition comprising, based on the total weight of the composition: 30 to 93 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof, 5 to 50 weight percent of polar filler selected from the group consisting of glass fibers, glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, ceramic fibers, and combinations thereof; and 2 to 20 weight percent of a poly(phenylene ether)-poly(hydroxy ether)-poly(phenylene ether) triblock copolymer. In this embodiment, the poly(phenylene ether)-poly(hydroxy ether)-poly(phenylene ether) triblock copolymer can, optionally, comprise a poly(phenylene ether) content of 30 to 70 weight percent, specifically 40 to 60 weight percent, based on the weight of the poly(phenylene ether)-poly(hydroxy ether)-poly(phenylene ether) triblock copolymer.

The non-polar polymer can be any of those described above in the context of the compatibilized blend of polar and non-polar polymers.

In some embodiments, the non-polar polymer is the poly (phenylene ether), optionally in combination with one or more of unhydrogenated block copolymers of alkenyl aromatic compounds and conjugated dienes, hydrogenated block copolymers of alkenyl aromatic compounds and conjugated dienes, and poly(alkenyl aromatic)s.

In some embodiments, the non-polar polymer is a combination of the poly(phenylene ether) and the poly(alkenyl aromatic), optionally further in combination with one or more of unhydrogenated block copolymers of alkenyl aromatic compounds and conjugated dienes, and hydrogenated block copolymers of alkenyl aromatic compounds and conjugated dienes.

In some embodiments, the non-polar polymer is the poly (alkenyl aromatic), optionally in combination with one or more of unhydrogenated block copolymers of alkenyl aromatic compounds and conjugated dienes, hydrogenated block copolymers of alkenyl aromatic compounds and conjugated dienes, and poly(phenylene ether)s.

The composition comprises the non-polar polymer in an amount of 30 to 93 weight percent, based on the total weight of the composition. Within this range, the non-polar polymer amount can be 40 to 86 weight percent, specifically 45 to 74 weight percent, more specifically 50 to 64 weight percent.

Suitable polar fillers include those described above in the context of the compatibilized blend of polar and non-polar polymers. In some embodiments, the polar filler is selected from the group consisting of glass fibers and combinations of glass fibers with one or more of glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, and ceramic fibers.

In some embodiments, the polar filler is selected from the group consisting of clays, talcs, micas, and combinations thereof, optionally in further combination with one or more of glass fibers, glass flakes, glass beads, silicas, aluminas, titanium dioxides, wollastonites, calcium carbonates, calcium sulfates, barium sulfates, dolomites, processed mineral fibers, metal oxides, metal hydroxides, and ceramic fibers.

One advantage of the use of the triblock copolymer to compatibilize polar fillers and non-polar polymers is that the polar filler need not be surface treated for the compatibilization to be effective. However, in some embodiments, it is desirable to use a surface-treated polar filler to further enhance the compatibility of the polar filler and the non-polar polymer. Surface treated polar fillers are the product of a process comprising treating a polar filler with a (non-polymeric) surface treatment agent to enhance its compatibility with the non-polar polymer. Surface treatment agents include, for example, γ-aminopropyltrialkoxysilanes (including γ-aminopropyltrimethoxysilane and γ-aminopropyltriethoxysilane), γ-(meth)acryloxypropyltrialkoxysilanes (including γ-acryloxypropyltrimethoxysilane, γ-methacryloxypropyltrimethoxysilane, γ-acryloxypropyltriethoxysilane, and γ-methacryloxypropyltriethoxysilane), β-(3,4-epoxycyclohexyl)ethyltrialkoxysiloxanes (including β-(3,4-epoxycyclohexyl)ethyltrimethoxysiloxane and β-(3,4-epoxycyclohexyl)ethyltriethoxysiloxane), and combinations thereof. The amount of surface treatment agent relative to polar filler will vary with the polar filler type but is generally 0.05 to 5 weight percent, based on the weight of the polar filler. Similarly, the resulting surface-treated polar filler will generally comprise 0.05 to 5 weight percent of surface treatment agent residue.

The composition comprises the polar filler in an amount of 5 to 50 weight percent, based on the total weight of the composition. Within this range, the polar filler amount can be 10 to 40 weight percent, specifically 15 to 30 weight percent.

In addition to the non-polar polymer and the polar filler, the composition comprises a poly(phenylene ether)-poly(hydroxy ether)-poly(phenylene ether) triblock copolymer. Any of the above-described variations of the poly(phenylene ether)-poly(hydroxy ether)-poly(phenylene ether) triblock copolymer can be used. For example, in some embodiments, each poly(phenylene ether) block of the poly(phenylene ether)-poly(hydroxy ether)-poly(phenylene ether) triblock copolymer independently comprises 2,6-dimethyl-1,4-phenylene ether units, 2,3,6-trimethyl-1,4-phenylene ether units, or a combination thereof; each poly(phenylene ether) block of the poly(phenylene ether)-poly(hydroxy ether)-poly(phenylene ether) triblock copolymer independently has a number average molecular weight of 1000 to 5000 atomic mass units; the poly(hydroxy ether) block of the poly(phenylene ether)-poly(hydroxy ether)-poly(phenylene ether) triblock copolymer has the structure

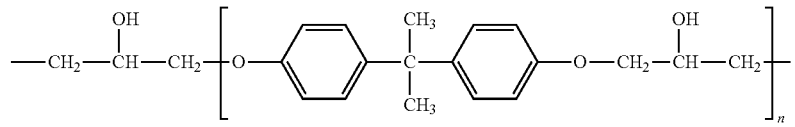

wherein n is 5 to 50; and the poly(phenylene ether)-poly(hydroxy ether)-poly(phenylene ether) triblock copolymer exhibits a first glass transition temperature of 95 to 115° C. and a second glass transition temperature of 170 to 220° C.

The composition comprises the poly(phenylene ether)-poly(hydroxy ether)-poly(phenylene ether) triblock copolymer in an amount of 2 to 20 weight percent, based on the total weight of the composition. Within this range, the triblock copolymer amount can be 4 to 15 weight percent, specifically 5 to 12 weight percent.

In a very specific embodiment of the composition, the non-polar polymer comprises polystyrene; the polar filler comprises glass fibers; each poly(phenylene ether) block of the poly(phenylene ether)-poly(hydroxy ether)-poly(phenylene ether) triblock copolymer comprises 2,6-dimethyl-1,4-phenylene ether units; each poly(phenylene ether) block of the poly(phenylene ether)-poly(hydroxy ether)-poly(phenylene ether) triblock copolymer independently has a number average molecular weight of 1500 to 3500 atomic mass units; the poly(hydroxy ether) block of the poly(phenylene ether)-poly(hydroxy ether)-poly(phenylene ether) triblock copolymer has the structure

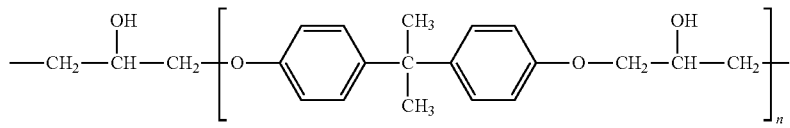

wherein n is 5 to 50; and the poly(phenylene ether)-poly(hydroxy ether)-poly(phenylene ether) triblock copolymer exhibits a first glass transition temperature of 95 to 115° C. and a second glass transition temperature of 170 to 220° C. In this embodiment, the poly(phenylene ether)-poly(hydroxy ether)-poly(phenylene ether) triblock copolymer can, optionally, comprise a poly(phenylene ether) content of 30 to 70 weight percent, specifically 40 to 60 weight percent, based on the weight of the poly(phenylene ether)-poly(hydroxy ether)-poly(phenylene ether) triblock copolymer.

The invention includes at least the following embodiments.

Embodiment 1

A poly(phenylene ether)-poly(hydroxy ether)-poly(phenylene ether) triblock copolymer, wherein each poly(phenylene ether) block independently has the structure

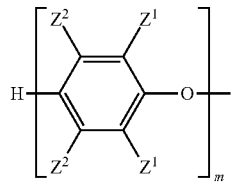

wherein m is 5 to 50; each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and wherein the poly(hydroxy ether) block has the structure

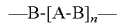

wherein A is a residue of structure

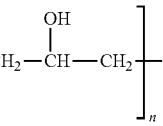

wherein each $G^1$ is independently at each occurrence a $C_6$-$C_{20}$ aromatic radical, and E is independently at each occurrence a direct bond, or a structure selected from the group consisting of

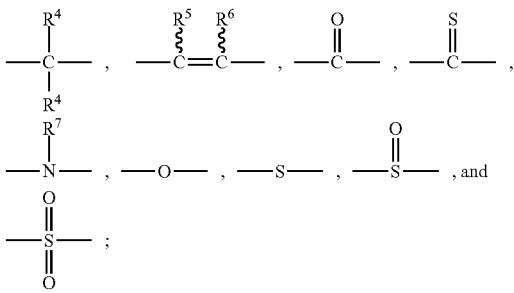

wherein each occurrence of $R^4$-$R^7$ is independently hydrogen or $C_1$-$C_{12}$ hydrocarbyl, s is 0 or 1, and t and u are each independently 1 to 10; and wherein B is a residue of structure

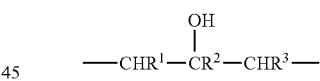

wherein $R^1$ to $R^3$ are each independently hydrogen, or $C_1$-$C_{12}$ hydrocarbyl; and wherein n is 2 to 60.

Embodiment 2

The poly(phenylene ether)-poly(hydroxy ether)-poly(phenylene ether) triblock copolymer of embodiment 1, exhibiting a first glass transition temperature of 95 to 115° C. and a second glass transition temperature of 170 to 220° C.

Embodiment 3

The poly(phenylene ether)-poly(hydroxy ether)-poly(phenylene ether) triblock copolymer of embodiment 1 or 2, wherein each poly(phenylene ether) block independently comprises 2,6-dimethyl-1,4-phenylene ether units, 2,3,6-trimethyl-1,4-phenylene ether units, or a combination thereof; wherein m is 10 to 40; and wherein the poly(hydroxy ether) block has the structure

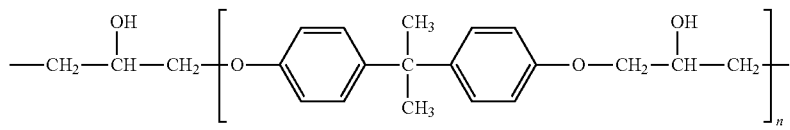

wherein n is 5 to 50.

Embodiment 4

The poly(phenylene ether)-poly(hydroxy ether)-poly(phenylene ether) triblock copolymer of any of embodiments 1-3, wherein each poly(phenylene ether) block independently has a number average molecular weight of 1,000 to 5,000 atomic mass units.

Embodiment 5

The poly(phenylene ether)-poly(hydroxy ether)-poly(phenylene ether) triblock copolymer of any of embodiments 1-4, comprising 30 to 70 weight percent poly(phenylene ether) blocks.

Embodiment 6

The poly(phenylene ether)-poly(hydroxy ether)-poly(phenylene ether) triblock copolymer of any of embodiments 1-5,

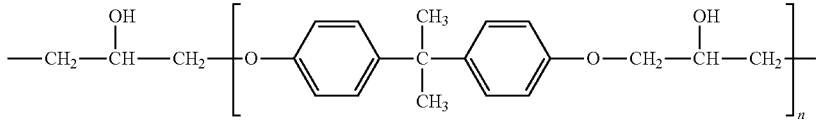

wherein the poly(hydroxy ether) block has a number average molecular weight of 2,000 to 10,000 atomic mass units.

Embodiment 7

The poly(phenylene ether)-poly(hydroxy ether)-poly(phenylene ether) triblock copolymer of any of embodiments 1-6, wherein each poly(phenylene ether) block independently comprises 2,6-dimethyl-1,4-phenylene ether units, 2,3,6-trimethyl-1,4-phenylene ether units, or a combination thereof; wherein each poly(phenylene ether) block independently has a number average molecular weight of 1000 to 5000 atomic mass units; wherein the poly(hydroxy ether) block has the structure

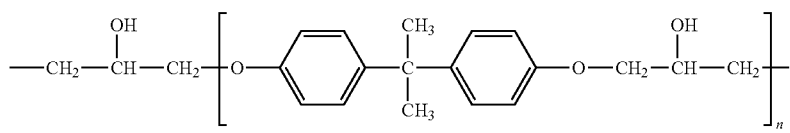

wherein n is 5 to 50; and wherein the poly(phenylene ether)-poly(hydroxy ether)-poly(phenylene ether) triblock copolymer exhibits a first glass transition temperature of 95 to 115° C. and a second glass transition temperature of 170 to 220° C.

Embodiment 7a

A poly(phenylene ether)-poly(hydroxy ether)-poly(phenylene ether) triblock copolymer, wherein each poly(phenylene ether) block independently has the structure

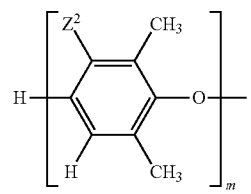

wherein m is 10 to 40, and each occurrence of $Z^2$ is independently hydrogen or methyl;

wherein the poly(hydroxy ether) block has the structure

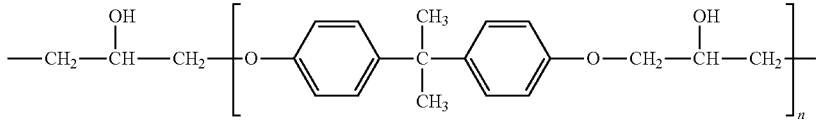

wherein n is 5 to 50; and wherein the poly(phenylene ether)-poly(hydroxy ether)-poly(phenylene ether) triblock copolymer exhibits a first glass transition temperature of 95 to 115° C. and a second glass transition temperature of 170 to 220° C.

Embodiment 8

A method of forming a poly(phenylene ether)-poly(hydroxy ether)-poly(phenylene ether) triblock copolymer, comprising: reacting a monohydroxy-terminated poly(phenylene ether) with a diepoxy-terminated poly(hydroxy ether) in the presence of a base.

Embodiment 9

A composition comprising, based on the total weight of the composition: 30 to 93 weight percent of a polar polymer selected from the group consisting of cellulose esters, poly(alkyl(meth)acrylate)s, polyamides, polycarbonates, polyesters, polyetherimides, polysulfones, polyethersulfones, poly(ethylene-ethyl acrylate)s, poly(ethylene-vinyl acetate)s, polyurethanes, poly(vinyl acetate)s, poly(vinyl alcohol)s, poly(styrene-acrylonitrile)s, poly(styrene-maleic anhydride)s, poly(vinyl butyral)s, and combinations thereof, 5 to 68 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof, and 2 to 20 weight percent of a poly(phenylene ether)-poly(hydroxy ether)-poly(phenylene ether) triblock copolymer.

Embodiment 10

The composition of embodiment 9, wherein the non-polar polymer is the poly(phenylene ether), optionally in combination with one or more of unhydrogenated block copolymers of alkenyl aromatic compounds and conjugated dienes, hydrogenated block copolymers of alkenyl aromatic compounds and conjugated dienes, and poly(alkenyl aromatic)s.

Embodiment 10a

The composition of embodiment 9, wherein the non-polar polymer is a combination of the poly(phenylene ether) and the poly(alkenyl aromatic), optionally further in combination with one or more of unhydrogenated block copolymers of alkenyl aromatic compounds and conjugated dienes, and hydrogenated block copolymers of alkenyl aromatic compounds and conjugated dienes.

Embodiment 10b

The composition of embodiment 9, wherein the non-polar polymer is a combination of the poly(phenylene ether) and the hydrogenated block copolymer of an alkenyl aromatic compound and a conjugated diene, optionally further in combination with one or more of poly(alkenyl aromatic)s, and unhydrogenated block copolymers of alkenyl aromatic compounds and conjugated dienes.

Embodiment 11

The composition of any of embodiments 9, 10, and 10a, wherein the polar polymer is the polyester, optionally in combination with one or more of cellulose esters, poly(alkyl(meth)acrylate)s, polyamides, polycarbonates, polyetherimides, polysulfones, polyethersulfones, poly(ethylene-ethyl acrylate)s, poly(ethylene-vinyl acetate)s, polyurethanes, poly(vinyl acetate)s, poly(vinyl alcohol)s, poly(styrene-acrylonitrile)s, poly(styrene-maleic anhydride)s, and poly(vinyl butyral)s.

Embodiment 12

The composition of any of embodiments 9, 10, and 10a, wherein the polar polymer is the polyamide, optionally in combination with one or more of cellulose esters, poly(alkyl(meth)acrylate)s, polyesters, polycarbonates, polyetherimides, polysulfones, polyethersulfones, poly(ethylene-ethyl acrylate)s, poly(ethylene-vinyl acetate)s, polyurethanes, poly(vinyl acetate)s, poly(vinyl alcohol)s, poly(styrene-acrylonitrile)s, poly(styrene-maleic anhydride)s, and poly(vinyl butyral)s.

Embodiment 13

The composition of any of embodiments 9, 10, 10a, 11, and 12, wherein each poly(phenylene ether) block of the poly(phenylene ether)-poly(hydroxy ether)-poly(phenylene ether) triblock copolymer independently comprises 2,6-dimethyl-1,4-phenylene ether units, 2,3,6-trimethyl-1,4-phenylene ether units, or a combination thereof; wherein each poly(phenylene ether) block of the poly(phenylene ether)-poly(hydroxy ether)-poly(phenylene ether) triblock copolymer independently has a number average molecular weight of 1000 to 5000 atomic mass units; wherein the poly(hydroxy ether) block of the poly(phenylene ether)-poly(hydroxy ether)-poly(phenylene ether) triblock copolymer has the structure

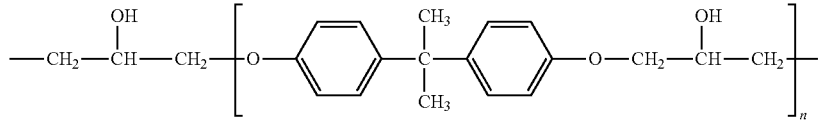

wherein n is 5 to 50; and wherein the poly(phenylene ether)-poly(hydroxy ether)-poly(phenylene ether) triblock copolymer exhibits a first glass transition temperature of 95 to 115° C. and a second glass transition temperature of 170 to 220° C.

Embodiment 14

The composition of embodiment 9, wherein each poly(phenylene ether) block of the poly(phenylene ether)-poly(hydroxy ether)-poly(phenylene ether) triblock copolymer comprises 2,6-dimethyl-1,4-phenylene ether units; wherein each poly(phenylene ether) block of the poly(phenylene ether)-poly(hydroxy ether)-poly(phenylene ether) triblock copolymer independently has a number average molecular weight of 1500 to 3500 atomic mass units; wherein the poly(hydroxy ether) block of the poly(phenylene ether)-poly(hydroxy ether)-poly(phenylene ether) triblock copolymer has the structure

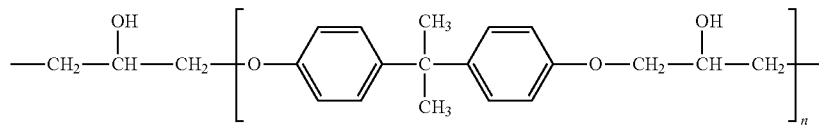

wherein n is 5 to 50; wherein the poly(phenylene ether)-poly (hydroxy ether)-poly(phenylene ether) triblock copolymer exhibits a first glass transition temperature of 95 to 115° C. and a second glass transition temperature of 170 to 220° C.; wherein the polar polymer is poly(ethylene terephthalate), poly(butylene terephthalate), or a combination thereof; and wherein the non-polar polymer is a combination of the poly (phenylene ether) and the hydrogenated block copolymer of an alkenyl aromatic compound and a conjugated diene, optionally in further combination with one or more of unhydrogenated block copolymers of alkenyl aromatic compounds and conjugated dienes, and poly(alkenyl aromatic)s.

Embodiment 15

A composition comprising, based on the total weight of the composition: 30 to 93 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof; 5 to 50 weight percent of polar filler selected from the group consisting of glass fibers, glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, ceramic fibers, and combinations thereof; and 2 to 20 weight percent of a poly(phenylene ether)-poly(hydroxy ether)-poly(phenylene ether) triblock copolymer.

Embodiment 16

The composition of embodiment 15, wherein the non-polar polymer is the poly(alkenyl aromatic), optionally in combination with one or more of unhydrogenated block copolymers of alkenyl aromatic compounds and conjugated dienes, hydrogenated block copolymers of alkenyl aromatic compounds and conjugated dienes, and poly(phenylene ether)s.

Embodiment 16a

The composition of embodiment 16, wherein the poly(alkenyl aromatic) is selected from the group consisting of atactic homopolystyrenes, syndiotactic homopolystyrenes, rubber-modified polystyrenes, and combinations thereof.

Embodiment 17

The composition of embodiment 15, wherein the non-polar polymer is the poly(phenylene ether), optionally in combination with one or more of unhydrogenated block copolymers of alkenyl aromatic compounds and conjugated dienes, hydrogenated block copolymers of alkenyl aromatic compounds and conjugated dienes, and poly(alkenyl aromatic)s.

Embodiment 17a

The composition of embodiment 15, wherein the non-polar polymer is a combination of the poly(phenylene ether) and the poly(alkenyl aromatic), optionally further in combination with one or more of unhydrogenated block copolymers of alkenyl aromatic compounds and conjugated dienes, and hydrogenated block copolymers of alkenyl aromatic compounds and conjugated dienes.

Embodiment 18

The composition of any of embodiments 15, 16, 16a, 17, and 17a, wherein the polar filler is the glass fibers, optionally in combination with one or more of glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, and ceramic fibers.

Embodiment 18a

The composition of any of embodiments 15, 16, 16a, 17, and 17a, wherein the polar filler is selected from the group consisting of clays, talcs, micas, and combinations thereof, optionally in further combination with one or more of glass fibers, glass flakes, glass beads, silicas, aluminas, titanium dioxides, wollastonites, calcium carbonates, calcium sulfates, barium sulfates, dolomites, processed mineral fibers, metal oxides, metal hydroxides, and ceramic fibers.

Embodiment 18b

The composition of any of embodiments 15, 16, 16a, 17, and 17a, 18, and 18a, wherein the polar filler is surface-treated polar filler that is the product of a process comprising treating a polar filler with a surface treatment agent selected from the group consisting of γ-aminopropyltrialkoxysilanes, γ-(meth)acryloxypropyltrialkoxysilanes, β-(3,4-epoxycyclohexyl)ethyltrialkoxysiloxanes, and combinations thereof.

Embodiment 19

The composition of any of embodiments 15, 16, 16a, 17, and 17a, 18, 18a, and 18b, wherein each poly(phenylene ether) block of the poly(phenylene ether)-poly(hydroxy ether)-poly(phenylene ether) triblock copolymer independently comprises 2,6-dimethyl-1,4-phenylene ether units, 2,3,6-trimethyl-1,4-phenylene ether units, or a combination thereof; wherein each poly(phenylene ether) block of the poly(phenylene ether)-poly(hydroxy ether)-poly(phenylene ether) triblock copolymer independently has a number average molecular weight of 1000 to 5000 atomic mass units; wherein the poly(hydroxy ether) block of the poly(phenylene ether)-poly(hydroxy ether)-poly(phenylene ether) triblock copolymer has the structure

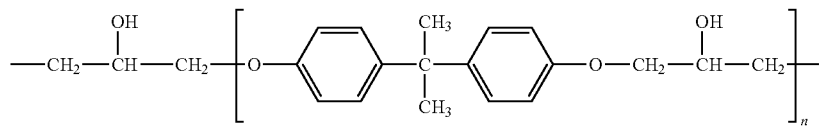

wherein n is 5 to 50; and wherein the poly(phenylene ether)-poly(hydroxy ether)-poly(phenylene ether) triblock copolymer exhibits a first glass transition temperature of 95 to 115° C. and a second glass transition temperature of 170 to 220° C.

Embodiment 20

The composition of embodiment 15, wherein the non-polar polymer is polystyrene, optionally in combination with one or more of unhydrogenated block copolymers of alkenyl aromatic compounds and conjugated dienes, hydrogenated block copolymers of alkenyl aromatic compounds and conjugated dienes, and poly(phenylene ether)s; wherein the polar filler is the glass fibers, optionally in combination with one or more of glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, and ceramic fibers; wherein each poly(phenylene ether) block of the poly(phenylene ether)-poly(hydroxy ether)-poly(phenylene ether) triblock copolymer comprises 2,6-dimethyl-1,4-phenylene ether units; wherein each poly(phenylene ether) block of the poly(phenylene ether)-poly(hydroxy ether)-poly(phenylene ether) triblock copolymer independently has a number average molecular weight of 1500 to 3500 atomic mass units; wherein the poly(hydroxy ether) block of the poly(phenylene ether)-poly(hydroxy ether)-poly(phenylene ether) triblock copolymer has the structure

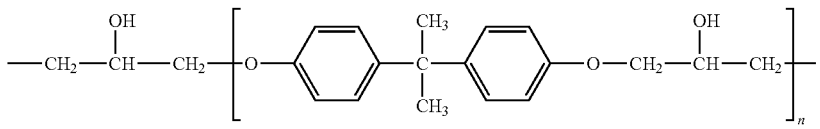

wherein n is 5 to 50; and wherein the poly(phenylene ether)-poly(hydroxy ether)-poly(phenylene ether) triblock copolymer exhibits a first glass transition temperature of 95 to 115° C. and a second glass transition temperature of 170 to 220° C.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

Materials

Materials used in the working examples are summarized in Table 1.

TABLE 1

| Component | Description |
|---|---|
| PPE 0.12 | Poly(2,6-dimethyl-1,4-phenylene ether) having an intrinsic viscosity of about 0.12 deciliter per gram measured in chloroform at 25° C., and a hydroxy equivalent weight of 2400 grams per equivalent; obtained as NORYL ™ SA120 resin from SABIC Innovative Plastics. |
| PPE 0.40 | Poly(2,6-dimethyl-1,4-phenylene ether) having an intrinsic viscosity of about 0.40 deciliter per gram measured in chloroform at 25° C.; obtained as PPO ™ 640 resin from SABIC Innovative Plastics. |
| EPON ™ 1009F | Copolymer of epichlorohydrin and 2,2-bis(p-hydroxyphenyl)propane (bisphenol A), CAS Reg. No. 25036-25-3, having an epoxy equivalent weight of about 2916 grams per equivalent; obtained as EPON ™ Resin 1009F from Momentive. |
| EPON ™ 1007F | Copolymer of epichlorohydrin and 2,2-bis(p-hydroxyphenyl)propane (bisphenol A), CAS Reg. No. 25036-25-3, having an epoxy equivalent weight of about 1810 grams per equivalent; obtained as EPON ™ Resin 1007F from Momentive. |
| D.E.R. ™ 6155 | Copolymer of epichlorohydrin and 2,2-bis(p-hydroxyphenyl)propane (bisphenol A), CAS Reg. No. 25036-25-3, having an epoxy equivalent weight of about 1365 grams per equivalent; obtained as D.E.R. ™ 6155 from The Dow Chemical Company. |
| D.E.R. ™ 668-20 | Copolymer of epichlorohydrin and 2,2-bis(p-hydroxyphenyl)propane (bisphenol A), CAS Reg. No. 25036-25-3, having an epoxy equivalent |

TABLE 1-continued

| Component | Description |
|---|---|
| | weight of about 2500 grams per equivalent; obtained as D.E.R. ™ 668-20 from The Dow Chemical Company. |
| D.E.R. ™ 669E | Copolymer of epichlorohydrin and 2,2-bis(p-hydroxyphenyl)propane (bisphenol A), CAS Reg. No. 25036-25-3, having an epoxy equivalent weight of about 2500 grams per equivalent; obtained as D.E.R. ™ 669E from The Dow Chemical Company. |
| D.E.R. ™ 669-20 | Copolymer of epichlorohydrin and 2,2-bis(p-hydroxyphenyl)propane (bisphenol A), CAS Reg. No. 25036-25-3, having an epoxy equivalent weight of about 4470 grams per equivalent; obtained as D.E.R. ™ 669-20 from The Dow Chemical Company. |
| DMAP | 4-(Dimethylamino)pyridine, CAS Reg. No. 1122-58-3, obtained from Sigma-Aldrich Co. LLC. |
| SEBS | Polystyrene-poly(ethylene-butylene)-polystyrene triblock copolymer, CAS Reg. No. 66070-58-4, having a polystyrene content of about 30 weight percent; obtained as KRATON ™ G1650 M from Kraton Performance Polymers, Inc. |
| PBT | Poly(butylene terephthalate), CAS Reg. No. 26092-94-2, having a melt volume-flow rate of about 6 cubic centimeters per 10 minutes measured at 250° C. and 1.2 kilogram load according to ISO 1133; obtained as VALOX ™ 315 resin from SABIC Innovative Plastics. |
| PET virgin | Poly(ethylene terephthalate, CAS Reg. No. 25038-59-9, virgin resin, having an intrinsic viscosity of about 0.65 deciliter per gram; obtained as Type 4048 resin from Invista S.A.R.L. |
| PET recycled | Poly(ethylene terephthalate), CAS Reg. No. 25038-59-9, recycled resin; obtained as PET Clear Bottle Flakes from Futura Polyesters Limited. |
| PS | Atactic polystyrene, CAS Reg. No. 9003-53-6, having a melt flow of about 1.5 grams per 10 minutes measured at 200° C. and a 5 kilogram load; obtained as STYRON ™ 685DL from Americas Styrenics LLC. |
| GF | Chopped glass fiber having a diameter of about 13-14 micrometers, a pre-compounded length of about 3.2 millimeters (⅛ inch), and an aminosilane surface treatment; obtained as E-Glass Chopped Strand T-849 from Nippon Electric Glass Company. |
| PKHH | Phenoxy resin produced by copolymerization of 2,2-bis(4-hydroxyphenyl)propane and 2,2-bis(4-hydroxyphenyl)propane-epichlorohydrin polymer, having a number average molecular weight of 10,000 atomic mass units and a calculated hydroxy group content of 5.99 weight percent.; obtained as PKHH from InChem Corporation. |
| PPE-PHE-PPE 45% | Poly(phenylene ether)-poly(hydroxy ether)-poly(phenylene ether) triblock copolymer prepared according to the method of Example 1, having about 45 weight percent poly(phenylene ether) blocks, and a calculated hydroxy group content of 3.29 weight percent. |
| PPE-PHE-PPE 57% | Poly(phenylene ether)-poly(hydroxy ether)-poly(phenylene ether) triblock copolymer prepared according to the method of Example 2, having about 57 weight percent poly(phenylene ether) blocks, and a calculated hydroxy group content of 2.58 weight percent. |
| TBPP | Tris(2,4-di-tert-butylphenyl) phosphite, CAS Reg. No. 31570-04-4; obtained as IRGAFOS 168 from BASF Corp. |
| PHBPP | Pentaerythritol tetrakis(3-(3,5-di-tert-butyl-4-hydroxyphenyl)propionate), CAS Reg. No. 6683-19-8; obtained as IRGANOX 1010 from BASF Corp. |
| $NaH_2PO_4$ | Anhydrous monosodium phosphate, CAS Reg. No. 7558-80-7. |
| PPE/SEBS masterbatch | A masterbatch prepared by melt blending 79.2 weight percent of PPE 0.40 IV, 19.8 weight percent of SEBS, 0.5 weight percent of TBPP, and 0.5 weight percent of PHBPP, prepared as described in Preparative Example 1. |
| PBT masterbatch | A masterbatch prepared by melt blending 99.7 weight percent of PBT and 0.3 weight percent of $NaH_2PO_4$, prepared as described in Preparative Example 2. |
| PET virgin masterbatch | A masterbatch prepared by melt blending 99.7 weight percent of PET virgin and 0.3 weight percent of $NaH_2PO_4$, prepared as described in Preparative Example 3. |
| PET recycled masterbatch | A masterbatch prepared by melt blending 99.7 weight percent of PET recycled and 0.3 weight percent of $NaH_2PO_4$, prepared as described in Preparative Example 4. |

Preparative Example 1

A masterbatch containing 79.2 weight percent poly(2,6-dimethyl-1,4-phenylene ether) ("PPE 0.40" in Table 1), 19.8 weight percent polystyrene-poly(ethylene-butylene)-polystyrene triblock copolymer ("SEBS" in Table 1), 0.5 weight percent of tris(2,4-di-tert-butylphenyl)phosphite ("TBPP" in Table 1), and 0.5 weight percent of pentaerythritol tetrakis(3-(3,5-di-tert-butyl-4-hydroxyphenyl)propionate) ("PHBPP" in Table 1) was prepared by compounding 8 kilograms poly(2,6-dimethyl-1,4-phenylene ether), 2 kilograms polystyrene-poly(ethylene-butylene)-polystyrene triblock copolymer, 50 grams of TBPP, and 50 grams of PHBPP. The mixture was extruded using a 30 millimeter screw diameter twin-screw Werner & Pfleiderer extruder operating at a screw rotation rate of 325 rotations per minute, a throughput of 48 pounds per hour (21.8 kilograms per hour), 83% torque, and zone temperatures of 240° C., 285° C., 285° C., 280° C., and 280° C., and 285° C. from feed throat to die.

Preparative Example 2

A stabilized poly(butylene terephthalate) masterbatch was prepared by compounding 2991 grams of poly(butylene terephthalate) ("PBT" in Table 1) with 9 grams (0.3 weight percent) of anhydrous monosodium phosphate (NaH$_2$PO$_4$ in Table 1) in a Coperion ZSK 18 twin-screw laboratory extruder (18 millimeter screw diameter) at a screw rotation rate of 300 rotations per minute, 40% torque, and zone temperatures of 180° C., 230° C., 260° C., 260° C., 260° C., 255° C., and 240° C. from feed throat to die.

Preparative Example 3

A stabilized poly(ethylene terephthalate) was prepared by compounding 2991 grams of poly(ethylene terephthalate) ("PET virgin" in Table 1) with 9 grams (0.3 weight percent) of anhydrous monosodium phosphate on a Coperion ZSK 18 twin-screw laboratory extruder (18 millimeter screw diameter) at a screw rotation rate of 300 rotations per minute, 75-100% torque, and zone temperatures of 180° C., 220° C., 250° C., 260° C., 260° C., 260° C., and 260° C. from feed throat to die.

Preparative Example 4

A stabilized poly(ethylene terephthalate) was prepared by compounding 2991 grams of poly(ethylene terephthalate) ("PET recycled" in Table 1) with 9 grams (0.3 weight percent) of anhydrous monosodium phosphate on a Coperion ZSK 18 twin-screw laboratory extruder (18 millimeter screw diameter) at a screw rotation rate of 300 rotations per minute, 55-70% torque, and zone temperatures of 180° C., 230° C., 250° C., 260° C., 260° C., 260° C., and 260° C. from feed throat to die.

Example 1

This example illustrates the preparation of a PPE-PHE-PPE triblock copolymer with 45.1 weight percent poly(phenylene ether). Reactant characteristics and amounts are summarized in Table 2, where "HEW" is an abbreviation of "Hydroxy Equivalent Weight" and refers to the mass of poly(phenylene ether) in grams per equivalent (mole) of hydroxy groups, and "EEW" is an abbreviation of "Epoxy Equivalent Weight" and refers to the mass of bisphenol A-epichlorohydrin copolymer ("epoxy resin") in grams per equivalent (mole) of epoxy groups.

TABLE 2

| Reactant | HEW (g/equiv.) | EEW (g/equiv.) | Grams | Equivalents |
|---|---|---|---|---|
| PPE 0.12 | 2400 | — | 225.75 | 0.0941 |
| EPON ™ 1009F | — | 2916 | 274.26 | 0.0941 |

The triblock copolymer was prepared as follows. To a two liter, three-neck round bottom flask equipped with a mechanical stirrer, thermocouple probe, powder funnel, and heating mantle, was added 500 milliliters cyclohexanone, which was heated to 140° C. The poly(phenylene ether) was added and dissolved. Then, 5.0 grams (0.0409 moles) of DMAP was added and dissolved. The epoxy resin was added in portions over 120 minutes, approximately following the portions shown in Table 3.

TABLE 3

| Time (min) | Epoxy resin added (wt %) |
|---|---|
| 0 | 63.8 |
| 30 | 20.0 |
| 60 | 10.9 |
| 90 | 2.9 |
| 120 | 1.6 |
| 150 | 0.8 |

The solution was stirred for 7 hours at 140° C. The reaction mixture was cooled below 80° C. and diluted with 400 milliliters 2-butanone. The reaction product was isolated by precipitation in methanol, filtered, washed with methanol, and dried in a vacuum oven at 100° C. The weight of product was 462 grams (92.4% yield).

Example 2

This example illustrates the preparation of a PPE-PHE-PPE triblock copolymer with 57.0 weight percent poly(phenylene ether). Reactant characteristics and amounts are summarized in Table 4.

TABLE 4

| Reactant | HEW (g/equiv.) | EEW (g/equiv.) | Grams | Equivalents |
|---|---|---|---|---|
| PPE 0.12 | 2400 | — | 285.04 | 0.1188 |
| EPON ™ 1007F | — | 1810 | 214.96 | 0.1188 |

The triblock copolymer was prepared as follows. To a two liter, three-neck round bottom flask equipped with a mechanical stirrer, thermocouple probe, powder funnel, and heating mantle, was added 500 ml cyclohexanone, which was heated to 140° C. The poly(phenylene ether) was added and dissolved. Then, 5.0 grams (0.0409 moles) of DMAP was added and dissolved. The epoxy resin was added in portions over 90 minutes, approximately following the portions shown in Table 5.

TABLE 5

| Time (min) | Epoxy resin added (wt %) |
|---|---|
| 0 | 62.8 |
| 30 | 31.6 |
| 60 | 4.7 |
| 90 | 0.9 |

The solution was stirred for seven hours at 140° C. The reaction mixture was cooled below 80° C. and diluted with 400 milliliters 2-butanone. The reaction product was isolated by precipitation in methanol, filtered, washed with methanol, and dried in a vacuum oven at 100° C. The weight of product was 462 grams (92.4% yield).

Example 3

This example illustrates the preparation of a PPE-PHE-PPE triblock copolymer with 63.8 weight percent poly(phenylene ether). Reactant characteristics and amounts are summarized in Table 6.

TABLE 6

| Reactant | HEW (g/equiv.) | EEW (g/equiv.) | Grams | Equivalents |
|---|---|---|---|---|
| PPE 0.12 | 2400 | — | 63.75 | 0.02656 |
| D.E.R. ™ 6155 | — | 1365 | 36.25 | 0.02656 |

The triblock copolymer was prepared as follows. To a 300 milliliter, three-neck round bottom flask equipped with a mechanical stirrer, thermocouple probe, powder funnel, and heating mantle, was added 100 milliliters cyclohexanone, which was heated to 140° C. The poly(phenylene ether) was added and dissolved. Then, 1.0 gram (0.0082 mole) of DMAP was added and dissolved. The epoxy resin was added in portions over 90 minutes, approximately following the portions shown in Table 7.

TABLE 7

| Time (min) | Epoxy resin added (wt %) |
|---|---|
| 0 | 70 |
| 30 | 25 |
| 60 | 3.5 |
| 90 | 1.5 |

The solution was stirred for seven hours at 140° C. The reaction mixture was cooled below 80° C. and diluted with 100 milliliters 2-butanone. The reaction product was isolated by precipitation in methanol, filtered, washed with methanol, and dried in a vacuum oven at 100° C. The weight of product was 87 grams (87% yield).

Example 4

This example illustrates the preparation of a PPE-PHE-PPE triblock copolymer with 48.9 weight percent poly(phenylene ether). Reactant characteristics and amounts are summarized in Table 8.

TABLE 8

| Reactant | HEW (g/equiv.) | EEW (g/equiv.) | Grams | Equivalents |
|---|---|---|---|---|
| PPE 0.12 | 2400 | — | 48.99 | 0.02041 |
| D.E.R. ™ 668-20 | — | 2500 | 51.02 | 0.02041 |

The triblock copolymer was prepared as follows. To a 300 milliliter, three-neck round bottom flask equipped with a mechanical stirrer, thermocouple probe, powder funnel, and heating mantle, was added 100 milliliters cyclohexanone, which was heated to 140° C. The poly(phenylene ether) was added and dissolved. Then, 1.0 gram (0.0082 mole) of DMAP was added and dissolved. The epoxy resin was added in portions over 90 minutes, approximately following the portions shown in Table 9.

TABLE 9

| Time (min) | Epoxy resin added (wt %) |
|---|---|
| 0 | 65 |
| 30 | 29.5 |
| 60 | 4.3 |
| 90 | 1.2 |

The solution was stirred for seven hours at 140° C. The reaction mixture was cooled below 80° C. and diluted with 100 milliliters 2-butanone. The reaction product was isolated by precipitation in methanol, filtered, washed with methanol, and dried in a vacuum oven at 100° C. The weight of product was 91 grams (91% yield).

Example 5

This example illustrates the preparation of a PPE-PHE-PPE triblock copolymer with 41.7 weight percent poly(phenylene ether). Reactant characteristics and amounts are summarized in Table 10.

TABLE 10

| Reactant | HEW (g/equiv.) | EEW (g/equiv.) | Grams | Equivalents |
|---|---|---|---|---|
| PPE 0.12 | 2400 | — | 41.67 | 0.01736 |
| D.E.R. ™ 669E | — | 3360 | 58.33 | 0.01736 |

The triblock copolymer was prepared as follows. To a 300 milliliter, three-neck round bottom flask equipped with a mechanical stirrer, thermocouple probe, powder funnel, and heating mantle, was added 100 milliliters cyclohexanone, which was heated to 140° C. The poly(phenylene ether) was added and dissolved. Then, 1.0 gram (0.0082 mole) of DMAP was added and dissolved. The epoxy resin was added in portions over 90 minutes, approximately following the portions shown in Table 11.

TABLE 11

| Time (min) | Epoxy resin added (wt %) |
|---|---|
| 0 | 63.4 |
| 30 | 26.4 |
| 60 | 8.7 |
| 90 | 1.5 |

The solution was stirred for seven hours at 140° C. The reaction mixture was cooled below 80° C. and diluted with 100 milliliters 2-butanone. The reaction product was isolated by precipitation in methanol, filtered, washed with methanol, and dried in a vacuum oven at 100° C. The weight of product was 82 grams (82% yield).

Example 6

This example illustrates the preparation of a PPE-PHE-PPE triblock copolymer with 34.9 weight percent poly(phenylene ether). Reactant characteristics and amounts are summarized in Table 12.

TABLE 12

| Reactant | HEW (g/equiv.) | EEW (g/equiv.) | Grams | Equivalents |
|---|---|---|---|---|
| PPE 0.12 | 2400 | — | 34.94 | 0.01456 |
| D.E.R. ™ 669-20 | — | 4470 | 65.06 | 0.01455 |

The triblock copolymer was prepared as follows. To a 300 milliliter, three-neck round bottom flask equipped with a mechanical stirrer, thermocouple probe, powder funnel, and heating mantle, was added 100 milliliters cyclohexanone, which was heated to 140° C. The poly(phenylene ether) was added and dissolved. Then, 1.0 gram (0.0082 mole) of DMAP was added and dissolved. The epoxy resin was added in portions over 120 minutes, approximately following the portions shown in Table 13.

TABLE 13

| Time (min) | Epoxy resin added (wt %) |
|---|---|
| 0 | 61.7 |
| 30 | 25.3 |
| 60 | 8.6 |
| 90 | 3.5 |
| 120 | 0.9 |

The solution was stirred for seven hours at 140° C. The reaction mixture was cooled below 80° C. and diluted with 100 milliliters 2-butanone. The reaction product was isolated by precipitation in methanol, filtered, washed with methanol, and dried in a vacuum oven at 100° C. The weight of product was 84 grams (84% yield).

Characterization of Triblock Copolymers

The PPE-PHE-PPE triblock copolymers were characterized by Differential Scanning calorimetry (DSC) according to ASTM D3418-08 using a TA Instruments 2920 M-DS operating with a temperature range of 30 to 250° C. and a heating rate of 20° C./minute. Over the temperature range studied, all the triblock copolymers exhibited two glass transition temperatures. The lower glass transition temperature (Tg1) values were approximately 105-106° C., corresponding to a poly(hydroxy ether) phase. The higher glass transition temperature (Tg2) values were approximately 179-183° C., corresponding to a poly(phenylene ether) phase. Results are summarized in Table 14.

TABLE 14

| Sample | Tg1 (° C.) | Tg2 (° C.) |
|---|---|---|
| Example 1 | 105.8 | 182.8 |
| Example 2 | 105.7 | 181.9 |
| Example 3 | 104.8 | 182.5 |
| Example 4 | 105.7 | 182.1 |
| Example 5 | 106.3 | 182.3 |
| Example 6 | 106.1 | 179.5 |

Samples were compression molded to form approximately 2.5 mm thick parts and moisture uptake was determined by immersion of test parts in deionized water at 80° C. and weighing the parts at 0, 24, 48, 72, 96, 168, 216, and 240 hours. Weight percent increases were then calculated at each time. Results (weight percent increase values) are presented in Table 15, where Comparative Example A is the phenoxy resin designated "PKHH" in Table 1. The results reveal lower moisture uptake with increasing levels of PPE in the triblock copolymers.

TABLE 15

| Immersion Time (hours) | Comparative Example A (0% PPE) | Example 6 (34.9% PPE) | Example 4 (48.9% PPE) | Example 3 (63.8% PPE) |
|---|---|---|---|---|
| 0 | 0 | 0 | 0 | 0 |
| 24 | 1.715 | 1.158 | 0.881 | 0.604 |
| 48 | 2.033 | 1.464 | 1.136 | 0.779 |
| 72 | 2.166 | 1.587 | 1.232 | 0.860 |
| 96 | 2.234 | 1.649 | 1.288 | 0.898 |
| 168 | 2.300 | 1.711 | 1.330 | 0.927 |
| 216 | 2.323 | 1.731 | 1.345 | 0.936 |
| 240 | 2.327 | 1.739 | 1.354 | 0.938 |

Examples 7-12, Comparative Examples 1-3

These examples illustrate the use of PPE-PHE-PPE triblock copolymers to compatibilize blends of the non-polar polymers poly(phenylene ether) and polystyrene-poly(ethylene-butylene)-polystyrene with the polar polymer poly(butylene terephthalate) (PBT).

The blends used the PPE/SEBS masterbatch described in Table 1. Comparative Example 1 is a blend of PBT with PPE/SEBS but without a poly(hydroxy ether) or PPE-PHE-PPE triblock copolymer. Comparative Examples 2 and 3 are blends of PBT, PPE/SEBS, and 2.5 and 5 weight percent, respectively, of the poly(hydroxy ether) designated PKHH in Table 1.

Compositions were compounded on a Coperion ZSK 18 twin-screw laboratory (18 millimeter screw outer diameter) extruder operating at a screw rotation rate of 300 rotations per minute, a torque of 60-75%, and zone temperatures of 180° C., 230° C., 250° C., 270° C., 270° C., 270° C., and 270° C. from feed throat to die. Articles for physical property testing were injection molded using a Demag Plastic Group Model 40-80 injection molding machine operating at barrel temperatures of 271° C., nozzle temperatures of 271° C., mold temperatures of 54° C., injection pressures of 9.77-10.47 megapascals, and back pressures of 0.35 megapascals.

Compositions and properties are summarized in Table 16, where component amounts are expressed in weight percent based on the total weight of the composition. Density values, expressed in units of grams per cubic centimeter, were determined according to ASTM D 792-08 at 23° C. Values of flexural modulus and flexural stress at 5% strain, both expressed in units of megapascals, were measured at 23° C. according to ASTM D790-10, Method B, using samples having a depth of 3.2 millimeters and a width of 12.7 millimeters, a support span length of 10 centimeters (3.937 inches), and a crosshead motion rate of 1.35 millimeters/minute (0.053 inch/minute). Heat deflection temperature values, expressed in units of degrees centigrade, were determined according to ASTM D648-07 using an edgewise test direction, cross-sectional dimensions of 3.2 millimeters by 12.5 millimeters, a load of 1.82 megapascals, and no annealing before testing. Values of tensile modulus, tensile stress at yield, and tensile stress at break, all expressed in units of megapascals, as well as values of tensile elongation at yield and tensile elongation at break, both expressed in units of percent, were determined at 23° C. according to ASTM D638-08 at 23° C. using a Type I bar, a gage length of 50 millimeters, and a test speed of 50 millimeters/minute. Notched Izod impact strength values, expressed in units of joules per meter, were determined according to ASTM D256-08, Method A, at a temperature of 23° C., a hammer energy of 2 foot-pounds (2.711 joules), and bar dimensions of 3.2 millimeters by 12.7 millimeters by 0.20 millimeters.

The results in Table 16 show that, relative to Comparative Example 1 (without poly(hydroxy ether) or PPE-PHE-PPE triblock copolymer) and Comparative Examples 2 and 3 (with poly(hydroxy ether)), Examples 7-12 with PPE-PHE-PPE triblock copolymer exhibited increased tensile elongation at yield, tensile elongation at break, and increased notched Izod impact strength. In addition, Examples 8, 9, 11, and 12 exhibited increased flexural modulus; Examples 8-12 exhibited flexural stress at 5% strain; Examples 8-10 exhibited increased heat deflection temperature; and Examples 7-9, 11, and 12 exhibit increased tensile stress at yield and tensile stress at break.

TABLE 16

|  | C. Ex. 1 | C. Ex. 2 | C. Ex. 3 | Ex. 7 | Ex. 8 |
| --- | --- | --- | --- | --- | --- |
| COMPOSITIONS | | | | | |
| PBT masterbatch | 40 | 40 | 40 | 40 | 40 |
| PPE/SEBS masterbatch | 60 | 57.5 | 55 | 57.5 | 55 |
| PKHH | 0 | 2.5 | 5 | 0 | 0 |
| PPE-PHE-PPE 57% | 0 | 0 | 0 | 2.5 | 5 |
| PPE-PHE-PPE 45% | 0 | 0 | 0 | 0 | 0 |
| PROPERTIES | | | | | |
| Density (g/cc) | 1.1305 | 1.1347 | 1.1387 | 1.1332 | 1.1359 |
| Flex. mod. (MPa) | 1635 | 1682 | 1727 | 1712 | 1792 |
| Flex. stress at 5% strain (MPa) | 56.4 | 58.7 | 60.8 | 60.6 | 64.3 |
| Heat deflection temp. (° C.) | 88.9 | 78.3 | 72.3 | 88.4 | 91.2 |
| Tensile modulus (MPa) | 1554 | 1615 | 1656 | 1644 | 1714 |
| Tensile stress at yield (MPa) | 31.02 | 33.52 | 35.06 | 35.86 | 39.34 |
| Tensile stress at break (MPa) | 31.02 | 33.10 | 34.62 | 35.22 | 38.58 |
| Tensile elongation at yield (%) | 4.7 | 4.8 | 4.8 | 5.2 | 5.5 |
| Tensile elongation at break (%) | 4.7 | 5.1 | 5.4 | 7.2 | 9.2 |
| Notched Izod (J/m) | 19.3 | 20.6 | 24.7 | 30.2 | 41.2 |

|  | Ex. 9 | Ex. 10 | Ex. 11 | Ex. 12 |
| --- | --- | --- | --- | --- |
| COMPOSITIONS | | | | |
| PBT masterbatch | 40 | 40 | 40 | 40 |
| PPE/SEBS masterbatch | 50 | 57.5 | 55 | 50 |
| PKHH | 0 | 0 | 0 | 0 |
| PPE-PHE-PPE 57% | 10 | 0 | 0 | 0 |
| PPE-PHE-PPE 45% | 0 | 2.5 | 5 | 10 |
| PROPERTIES | | | | |
| Density (g/cc) | 1.1397 | 1.1336 | 1.1362 | 1.1401 |
| Flex. mod. (MPa) | 1942 | 1696 | 1753 | 1874 |
| Flex. stress at 5% strain (MPa) | 70.5 | 59.8 | 62.9 | 66.2 |
| Heat deflection temp. (° C.) | 89.3 | 90.1 | 86.2 | 86.2 |
| Tensile modulus (MPa) | 1836 | 1630 | 1688 | 1804 |
| Tensile stress at yield (MPa) | 44.28 | 34.72 | 37.97 | 42.29 |
| Tensile stress at break (MPa) | 43.05 | 34.46 | 37.28 | 41.54 |
| Tensile elongation at yield (%) | 5.8 | 5.1 | 5.3 | 5.6 |
| Tensile elongation at break (%) | 12.2 | 6.5 | 8.2 | 10.4 |
| Notched Izod (J/m) | 74.3 | 26.3 | 32.0 | 46.5 |

Figure 2:
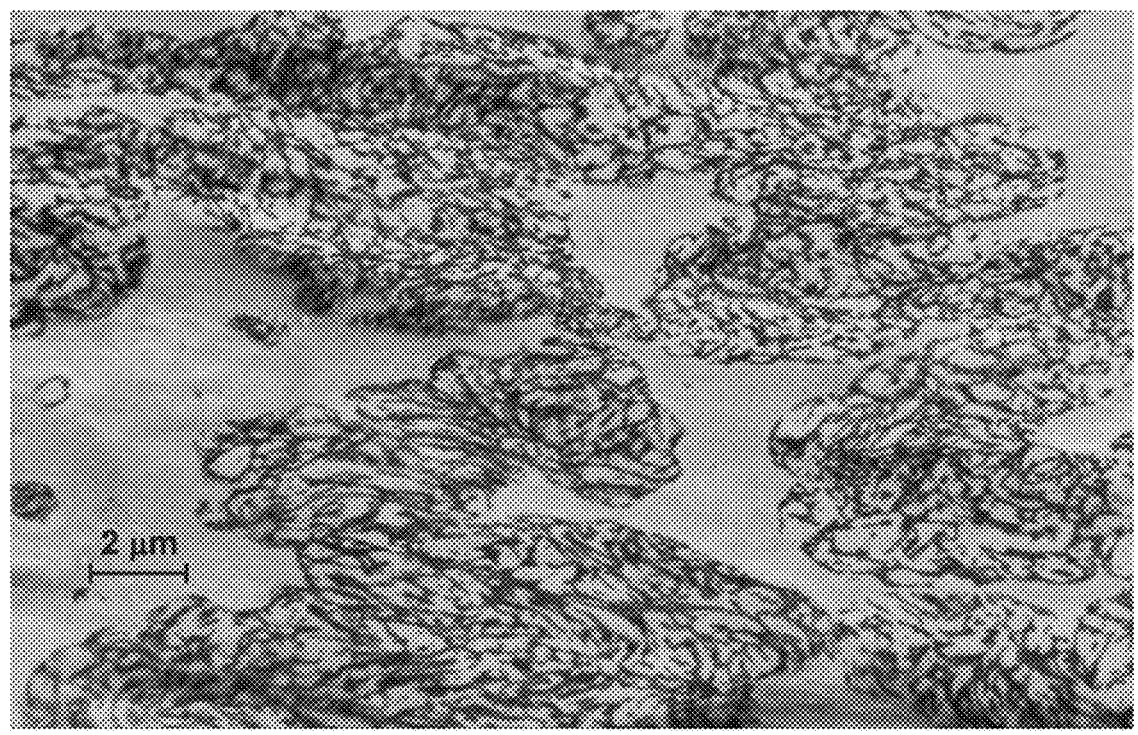
FIG. 2 is another scanning transmission electron micrograph obtained at 5,000× magnification of the Comparative Example 3 composition with poly(butylene terephthalate), poly(phenylene ether), polystyrene-poly(ethylene-butylene)-polystyrene, and 5 weight percent poly(hydroxy ether).
Figure 3:
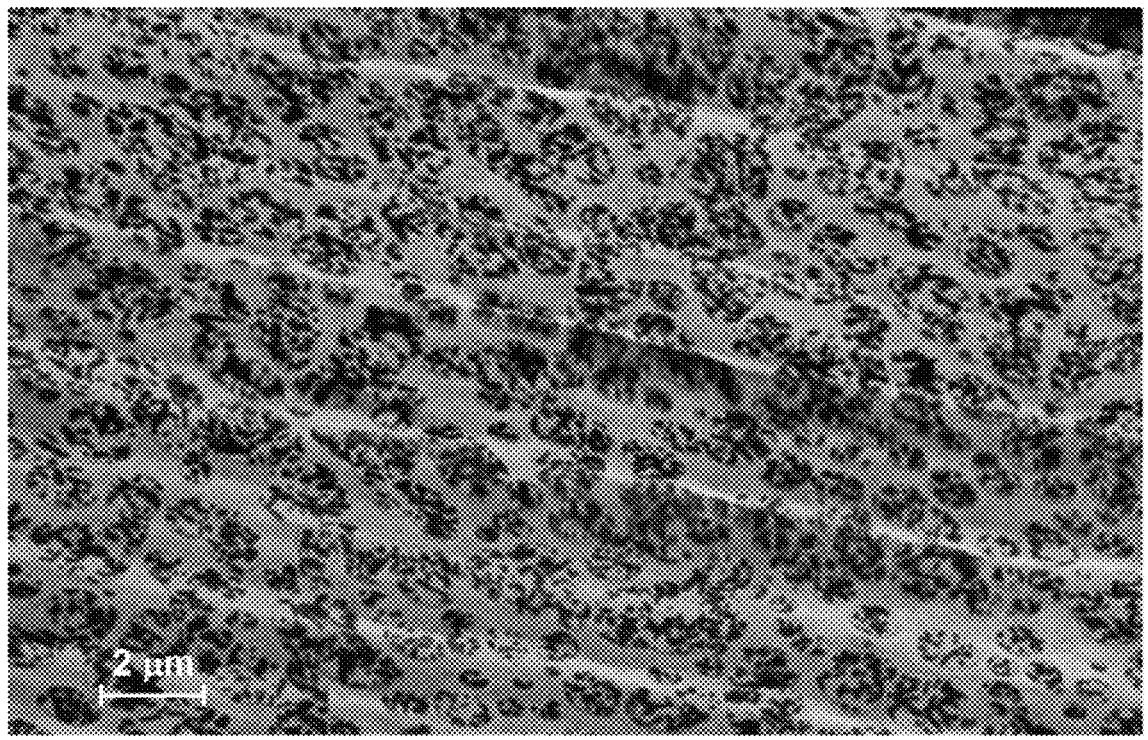
FIG. 3 is a scanning transmission electron micrograph obtained at 5,000× magnification of the Example 8 composition with poly(butylene terephthalate), poly(phenylene ether), polystyrene-poly(ethylene-butylene)-polystyrene, and 5 weight percent of the poly(phenylene ether)-poly(hydroxy ether)-poly(phenylene ether) (PPE-PHE-PPE) triblock copolymer with 57% poly(phenylene ether) (PPE) content.
Figure 4:
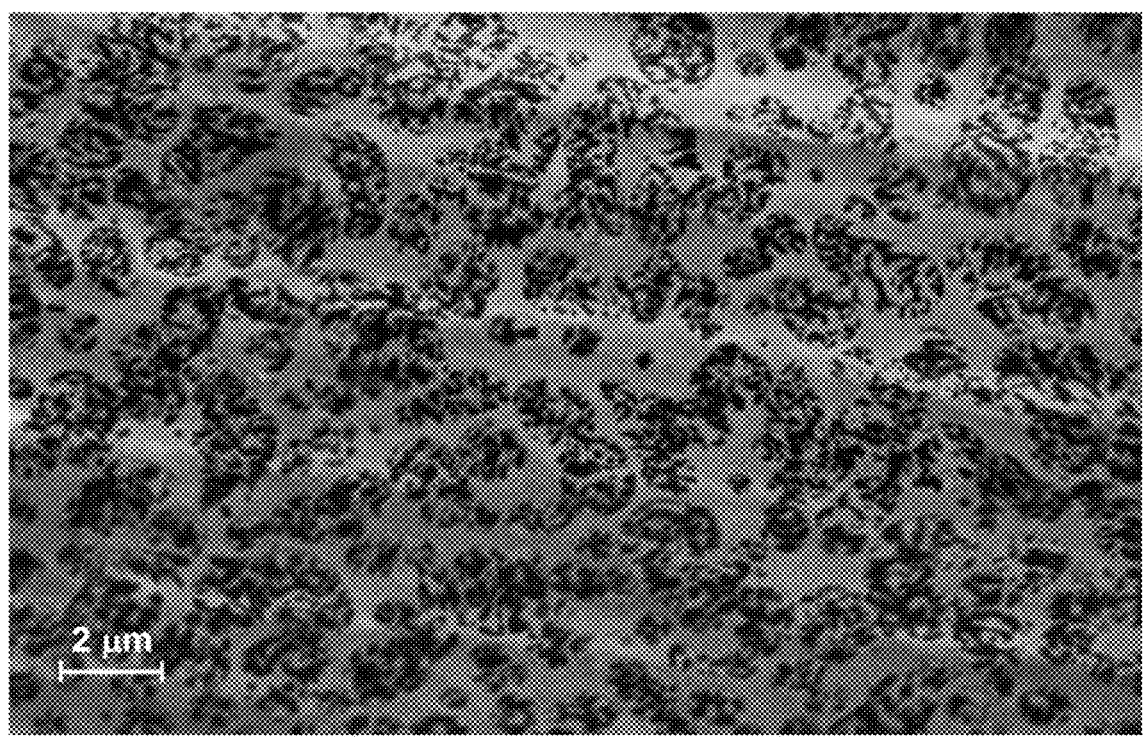
FIG. 4 is a scanning transmission electron micrograph of the Example 11 composition with poly(butylene terephthalate), poly(phenylene ether), polystyrene-poly(ethylene-butylene)-polystyrene, and 5 weight percent of the PPE-PHE-PPE triblock copolymer with 45% PPE content.

The morphologies of the Comparative Example 3, Example 8, and Example 11 were investigated by scanning transmission electron microscopy. Microtomed surfaces were stained with osmium tetroxide for 15 minutes and ruthenium tetroxide for 45 seconds and observed with a Zeiss EVO40 XVP scanning electron microscope with scanning transmission electron microscopy module. FIG. 1, obtained at 25,000× magnification and corresponding to Comparative Example 3, depicts the different phases of the micrograph. The disperse phase consists substantially of poly(phenylene ether) (labeled "1") and polystyrene-poly(ethylene-butylene)-polystyrene (labeled "2"), and the continuous phase consists substantially of poly(butylene terephthalate) (labeled "3"). Representative micrographs obtained at 5,000× magnification for Comparative Example 3, Example 8, and Example 11 are presented as FIGS. 2, 3, and 4, respectively. FIG. 2, corresponding to Comparative Example 3 with 5 weight percent poly(hydroxy ether), shows very large poly(phenylene ether)/polystyrene-poly(ethylene-butylene)-polystyrene disperse phase domains. In contrast, FIGS. 3 and 4, corresponding, respectively, to Example 8 with 5 weight percent of the PPE-PHE-PPE triblock copolymer with 57% PPE, and Example 11, with 5 weight percent of the PPE-PHE-PPE triblock copolymer with 45% PPE, show significantly smaller poly(phenylene ether)/polystyrene-poly(ethylene-butylene)-polystyrene disperse phase domains.

Examples 13-18, Comparative Examples 4-6

These examples illustrate the use of PPE-PHE-PPE triblock copolymers to compatibilize blends of the non-polar polymers poly(phenylene ether) and polystyrene-poly(ethylene-butylene)-polystyrene with the polar polymer poly(ethylene terephthalate) (PET). The PET was obtained as a virgin resin.

Compositions were compounded on a Coperion ZSK 18 twin-screw laboratory (18 millimeter screw outer diameter) extruder operating at a screw rotation rate of 300 rotations per minute, a torque of 60-75%, and zone temperatures of 180° C., 230° C., 250° C., 270° C., 270° C., 270° C., and 270° C. from feed throat to die. Articles for physical property testing were injection molded using a Demag Plastic Group Model 40-80 injection molding machine operating at barrel temperatures of 254-304° C., nozzle temperatures of 271-304° C., mold temperatures of 54-77° C., injection pressures of 9.07-11.17 megapascals, and back pressures of 0.35 megapascals.

Compositions and properties are summarized in Table 17. The results show that, relative to Comparative Example 4 (without compatibilizer) and Comparative Examples 5 and 6 (with poly(hydroxy ether)), Examples 13-18 with PPE-PHE-PPE triblock copolymer exhibit increased flexural modulus, heat deflection temperature, tensile modulus, tensile stress at yield, tensile stress at break, tensile elongation at break, and notched Izod impact strength. In addition, Examples 13-15, 17, and 18 exhibit increased flexural stress at 5% strain, tensile elongation at yield.

TABLE 17

|  | C. Ex. 4 | C. Ex. 5 | C. Ex. 6 | Ex. 13 | Ex. 14 |
|---|---|---|---|---|---|
| COMPOSITIONS | | | | | |
| PET virgin masterbatch | 40 | 40 | 40 | 40 | 40 |
| PPE/SEBS (80/20) masterbatch | 60 | 57.5 | 55 | 57.5 | 55 |
| PKHH | 0 | 2.5 | 5 | 0 | 0 |
| PPE-PHE-PPE 57% | 0 | 0 | 0 | 2.5 | 5 |
| PPE-PHE-PPE 45% | 0 | 0 | 0 | 0 | 0 |
| PROPERTIES | | | | | |
| Density (g/cc) | 1.1339 | 1.1422 | 1.1465 | 1.1393 | 1.1426 |
| Flex. mod. (MPa) | 1668 | 1719 | 1745 | 1770 | 1868 |
| Flex. stress at 5% strain (MPa) | 54.8 | 60.2 | 62.6 | 63.2 | 67.9 |
| Heat deflection temp. (° C.) | 70.5 | 71.0 | 71.4 | 72.6 | 73.8 |
| Tensile modulus (MPa) | 1564 | 1635 | 1667 | 1703 | 1770 |
| Tensile stress at yield (MPa) | 30.5 | 34.9 | 36.8 | 38.2 | 41.4 |
| Tensile stress at break (MPa) | 30.5 | 34.7 | 36.4 | 37.4 | 40.4 |
| Tensile elongation at yield (%) | 2.8 | 3.8 | 4.4 | 5.0 | 6.1 |
| Tensile elongation at break (%) | 2.8 | 4.0 | 5.0 | 8.0 | 10.0 |
| Notched Izod (J/m) | 17.7 | 19.2 | 20.1 | 21.1 | 24.2 |

|  | Ex. 15 | Ex. 16 | Ex. 17 | Ex. 18 |
|---|---|---|---|---|
| COMPOSITIONS | | | | |
| PET virgin masterbatch | 40 | 40 | 40 | 40 |
| PPE/SEBS (80/20) masterbatch | 50 | 57.5 | 55 | 50 |
| PET virgin masterbatch | 0 | 0 | 0 | 0 |
| PPE-PHE-PPE 57% | 10 | 0 | 0 | 0 |
| PPE-PHE-PPE 45% | 0 | 2.5 | 5 | 10 |
| PROPERTIES | | | | |
| Density (g/cc) | 1.1471 | 1.1397 | 1.1431 | 1.1480 |
| Flex. mod. (MPa) | 1960 | 1749 | 1819 | 1918 |
| Flex. stress at 5% strain (MPa) | 71.7 | 62.0 | 65.5 | 69.3 |
| Heat deflection temp. (° C.) | 74.4 | 72.0 | 73.0 | 73.5 |
| Tensile modulus (MPa) | 1841 | 1676 | 1730 | 1814 |
| Tensile stress at yield (MPa) | 43.5 | 37.4 | 40.4 | 41.9 |
| Tensile stress at break (MPa) | 42.4 | 36.7 | 39.7 | 40.9 |
| Tensile elongation at yield (%) | 6.9 | 4.4 | 5.5 | 6.1 |
| Tensile elongation at break (%) | 12.2 | 6.5 | 8.3 | 11.2 |
| Notched Izod (J/m) | 27.9 | 20.3 | 22.3 | 25.1 |

Examples 19-24, Comparative Examples 7-9

These examples further illustrate the use of PPE-PHE-PPE triblock copolymers to compatibilize blends of the non-polar polymers poly(phenylene ether) and polystyrene-poly(ethylene-butylene)-polystyrene with the polar polymer poly(ethylene terephthalate) (PET). The PET was obtained as a recycled resin.

Compositions and properties are summarized in Table 18. The results show that, relative to Comparative Example 7 (without compatibilizer) and Comparative Examples 8 and 9 (with poly(hydroxy ether)), Examples 19-24 with PPE-PHE-PPE triblock copolymer exhibit increased heat deflection temperature, tensile modulus, tensile stress at yield, tensile stress at break, tensile elongation at yield, tensile elongation at break, and notched Izod impact strength. In addition, Examples 12-21, 23, and 24 exhibit increased flexural modulus and flexural stress at 5% strain.

TABLE 18

|  | C. Ex. 7 | C. Ex. 8 | C. Ex. 9 | Ex. 19 | Ex. 20 |
|---|---|---|---|---|---|
| COMPOSITIONS | | | | | |
| PET recycled masterbatch | 40 | 40 | 40 | 40 | 40 |
| PPE/SEBS (80/20) masterbatch | 60 | 57.5 | 55 | 57.5 | 55 |
| PKHH | 0 | 2.5 | 5 | 0 | 0 |
| PPE-PHE-PPE 57% | 0 | 0 | 0 | 2.5 | 5 |
| PPE-PHE-PPE 45% | 0 | 0 | 0 | 0 | 0 |
| PROPERTIES | | | | | |
| Density (g/cc) | 1.1348 | 1.1356 | 1.1365 | 1.1387 | 1.1419 |
| Flex. mod. (MPa) | 1675 | 1734 | 1767 | 1785 | 1838 |
| Flex. stress at 5% strain (MPa) | 57.8 | 60.0 | 61.9 | 62.2 | 65.0 |
| Heat deflection temp. (° C.) | 71.1 | 71.5 | 71.4 | 72.5 | 73.2 |
| Tensile modulus (MPa) | 1552 | 1607 | 1643 | 1684 | 1763 |
| Tensile stress at yield (MPa) | 30.0 | 36.7 | 37.6 | 39.1 | 41.4 |
| Tensile stress at break (MPa) | 31.3 | 36.1 | 37.1 | 37.8 | 39.3 |
| Tensile elongation at yield (%) | 3.1 | 3.7 | 4.0 | 5.4 | 6.2 |

TABLE 18-continued

| | | | | | |
|---|---|---|---|---|---|
| Tensile elongation at break (%) | 3.1 | 6.4 | 7.3 | 10.1 | 13.6 |
| Notched Izod (J/m) | 17.1 | 23.4 | 26.2 | 29.8 | 39.2 |

| | Ex. 21 | Ex. 22 | Ex. 23 | Ex. 24 |
|---|---|---|---|---|
| COMPOSITIONS | | | | |
| PET recycled masterbatch | 40 | 40 | 40 | 40 |
| PPE/SEBS (80/20) masterbatch | 50 | 57.5 | 55 | 50 |
| PKHH | 0 | 0 | 0 | 0 |
| PPE-PHE-PPE 57% | 10 | 0 | 0 | 0 |
| PPE-PHE-PPE 45% | 0 | 2.5 | 5 | 10 |
| PROPERTIES | | | | |
| Density (g/cc) | 1.1484 | 1.1394 | 1.1428 | 1.1491 |
| Flex. mod. (MPa) | 1935 | 1765 | 1801 | 1879 |
| Flex. stress at 5% strain (MPa) | 69.5 | 61.5 | 63.6 | 66.3 |
| Heat deflection temp. (° C.) | 73.9 | 72.2 | 72.8 | 73.2 |
| Tensile modulus (MPa) | 1855 | 1661 | 1726 | 1804 |
| Tensile stress at yield (MPa) | 43.5 | 38.4 | 40.3 | 41.7 |
| Tensile stress at break (MPa) | 40.5 | 37.2 | 38.4 | 39.7 |
| Tensile elongation at yield (%) | 6.6 | 4.6 | 5.1 | 5.7 |
| Tensile elongation at break (%) | 16.8 | 8.4 | 11.9 | 14.9 |
| Notched Izod (J/m) | 51.7 | 27.2 | 35.2 | 44.2 |

Examples 25-30, Comparative Examples 10-12

These examples illustrate the use of PPE-PHE-PPE triblock copolymers to compatibilize blends of the non-polar polymer polystyrene with the polar filler glass fibers.

Compositions were compounded on a Coperion ZSK 18 twin-screw laboratory (18 millimeter screw outer diameter) extruder operating at a screw rotation rate of 300 rotations per minute, a torque of 60-70%, and zone temperatures of 180° C., 230° C., 250° C., 270° C., 270° C., 270° C., and 280° C. from feed throat to die. Articles for physical property testing were injection molded using a Demag Plastic Group Model 40-80 injection molding machine operating at a barrel temperature of 288° C., a nozzle temperature of 288° C., a mold temperature of 60° C., injection pressures of 10.47 megapascals, and a back pressure of 0.14 megapascal.

Compositions and properties are summarized in Table 19. Values for flexural modulus, flexural stress at yield, and flexural stress at break, all expressed in units of megapascals, were determined according to ASTM D790-07e1, Procedure A, using a temperature of 23° C., bar cross-sectional dimensions of 3.2 millimeters by 12.7 millimeters, a support span of 50.8 millimeters, and a test speed of 1.27 millimeters/minute (0.05 inches/minute). Tensile stress at yield values were determined according to ASTM D638-08 at 23° C. using a Type I bar, a gage length of 50 millimeters, and a test speed of 5 millimeters/minute. Other property values were determined as described above for Examples 1-6.

The results in Table 19 show that relative to Comparative Example 10 (with no compatibilizer) and Comparative Examples 11 and 12 (with poly(hydroxy ether)), Examples 25-30 with PPE-PHE-PPE triblock copolymer exhibit increased flexural modulus, flexural stress at yield, flexural stress at break, heat deflection temperature, notched Izod impact strength, tensile stress at break, and tensile elongation at break.

TABLE 19

| | C. Ex. 10 | C. Ex. 11 | C. Ex. 12 | Ex. 25 | Ex. 26 |
|---|---|---|---|---|---|
| COMPOSITIONS | | | | | |
| PS | 80 | 77.5 | 75 | 77.5 | 75 |
| GF | 20 | 20 | 20 | 20 | 20 |
| PKHH | 0 | 2.5 | 5 | 0 | 0 |
| PPE-PHE-PPE 57% | 0 | 0 | 0 | 2.5 | 5 |
| PPE-PHE-PPE 45% | 0 | 0 | 0 | 0 | 0 |
| PROPERTIES | | | | | |
| Density (g/cc) | 1.1924 | 1.1986 | 1.2001 | 1.1965 | 1.1980 |
| Flex. mod. (MPa) | 6447 | 6457 | 6435 | 6531 | 6526 |
| Flex. stress at yield (MPa) | 105.8 | 110.5 | 113.9 | 128.4 | 130.5 |
| Flex. stress at break (MPa) | 105.3 | 110.5 | 113.9 | 128.4 | 130.5 |
| Heat deflection temp. (° C.) | 99.8 | 97.2 | 96.2 | 101.3 | 102.1 |
| Notched Izod (J/m) | 33.1 | 35.4 | 33.1 | 52.9 | 51.7 |
| Tensile modulus (MPa) | 6920 | 6918 | 6918 | 6969 | 6952 |
| Tensile stress at break (MPa) | 68.02 | 70.80 | 74.42 | 83.98 | 85.48 |
| Tensile elongation at break (%) | 1.40 | 1.52 | 1.58 | 1.90 | 1.94 |

| | Ex. 27 | Ex. 28 | Ex. 29 | Ex. 30 |
|---|---|---|---|---|
| COMPOSITIONS | | | | |
| PS | 70 | 77.5 | 75 | 70 |
| GF | 20 | 20 | 20 | 20 |

TABLE 19-continued

| | | | | |
|---|---|---|---|---|
| PKHH | 0 | 0 | 0 | 0 |
| PPE-PHE-PPE 57% | 10 | 0 | 0 | 0 |
| PPE-PHE-PPE 45% | 0 | 2.5 | 5 | 10 |
| PROPERTIES | | | | |
| Density (g/cc) | 1.2040 | 1.1966 | 1.1983 | 1.2071 |
| Flex. mod. (MPa) | 6489 | 6554 | 6544 | 6516 |
| Flex. stress at yield (MPa) | 119.8 | 135.8 | 133.0 | 127.8 |
| Flex. stress at break (MPa) | 119.8 | 134.9 | 132.8 | 127.6 |
| Heat deflection temp. (° C.) | 104.0 | 101.0 | 101.5 | 102.4 |
| Notched Izod (J/m) | 43.6 | 53.4 | 49.9 | 46.6 |
| Tensile modulus (MPa) | 6936 | 7000 | 6964 | 6945 |
| Tensile stress at break (MPa) | 82.36 | 86.54 | 84.86 | 80.26 |
| Tensile elongation at break (%) | 1.72 | 1.94 | 1.88 | 1.64 |

These enhanced physical properties obtained in Examples 25-30, which contain PPE-PHE-PPE triblock copolymers, suggest that the PPE-PHE-PPE triblock copolymers are effective in increasing the interfacial adhesion between the polystyrene phase and glass fiber. Therefore, the polystyrene-glass fiber interfaces were examined by Scanning Electron Microscopy (SEM).

Samples for Scanning Electron Microscopy (SEM) were cryo-fractured in liquid nitrogen and mounted on SEM stubs. Then the samples were coated with gold. The samples were examined using a Carl Zeiss AG-EVO® 40 Series scanning electron microscope. The conditions were SEM mode, a probe current of 40 picoamps, HV (high vacuum), and an acceleration voltage of 20 kilovolts.

Figure 5:
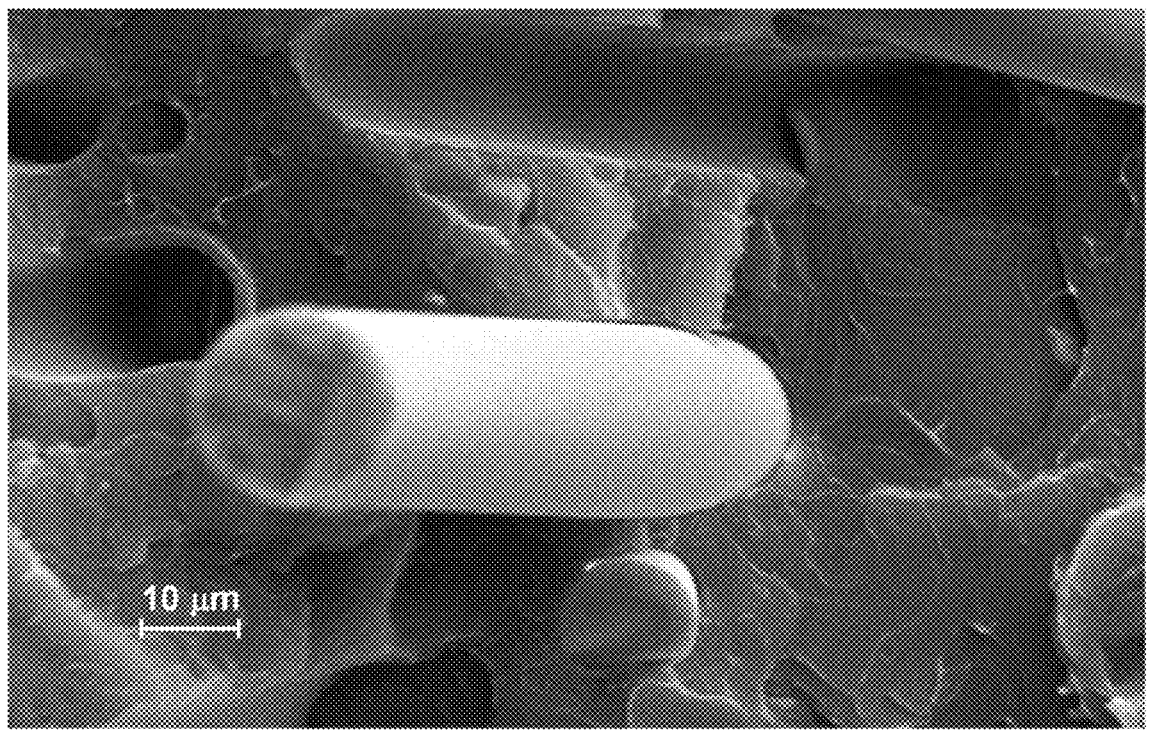
FIG. 5 is a scanning electron micrograph of the Comparative Example 10 composition with polystyrene, surface-treated glass fiber, and no compatibilizer.

FIG. 5 corresponds to Comparative Example 10. There is no indication of any polystyrene interaction with the glass fiber. The glass fiber appears bare and there is no indication of polystyrene adhering to the glass fiber. There is separation between the glass fiber and the polystyrene.

Figure 6:
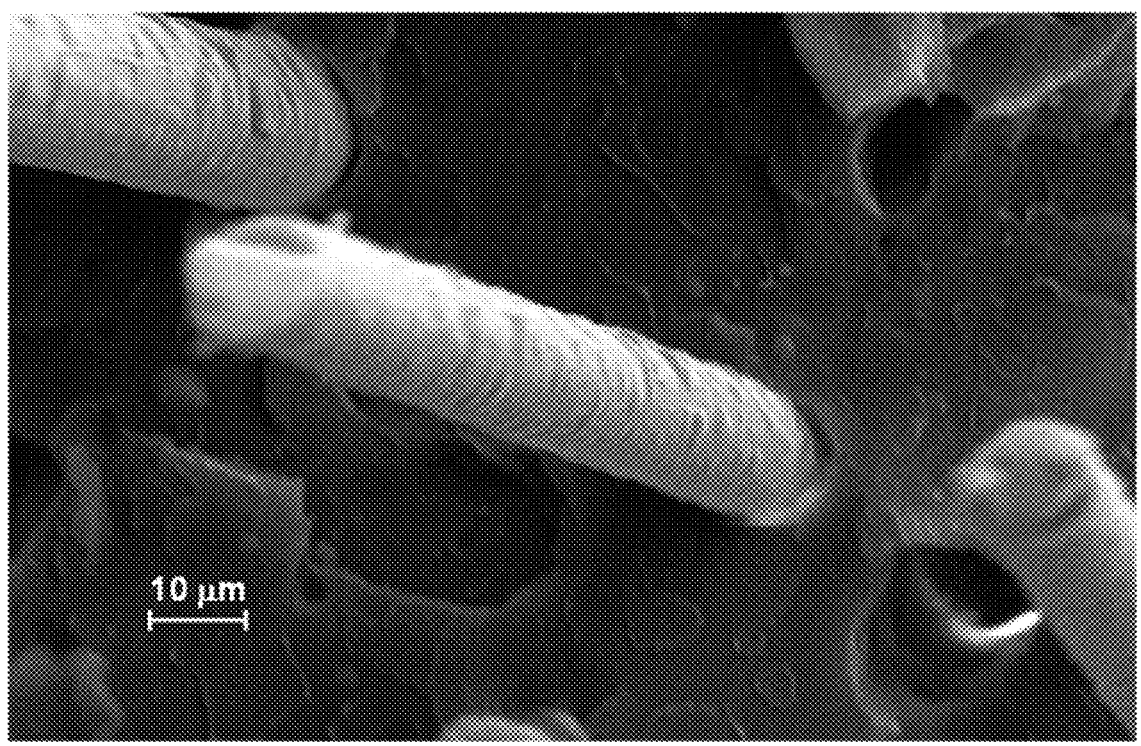
FIG. 6 is a scanning electron micrograph of the Comparative Example 11 composition with polystyrene, surface-treated glass fiber, and 2.5 weight percent poly(hydroxy ether).

FIG. 6 corresponds to Comparative Example 11. There is no indication of any strong interaction of the resin with the glass fiber. The glass fiber is unattached from the polystyrene/poly(hydroxy ether) resin. There appears to be a low level of some resin adhering to the glass fiber, which is presumably the poly(hydroxy ether).

Figure 7:
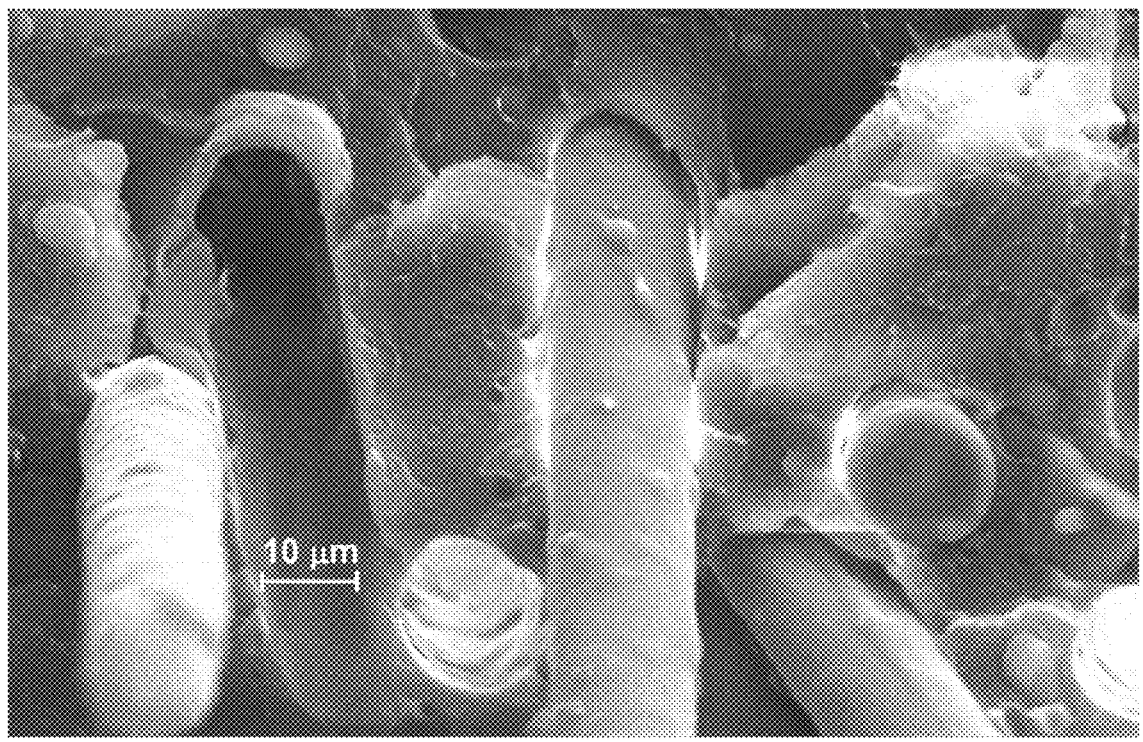
FIG. 7 is a scanning electron micrograph of the Comparative Example 12 composition with polystyrene, surface-treated glass fiber, and 5 weight percent poly(hydroxy ether).

FIG. 7 corresponds to Comparative Example 12. There is no indication of any strong interaction of the resin with the glass fiber. The glass fiber is unattached from the polystyrene/poly(hydroxy ether) resin. There appears to be a low level of some resin adhering to the glass fiber, which is presumably the poly(hydroxy ether).

Figure 8:
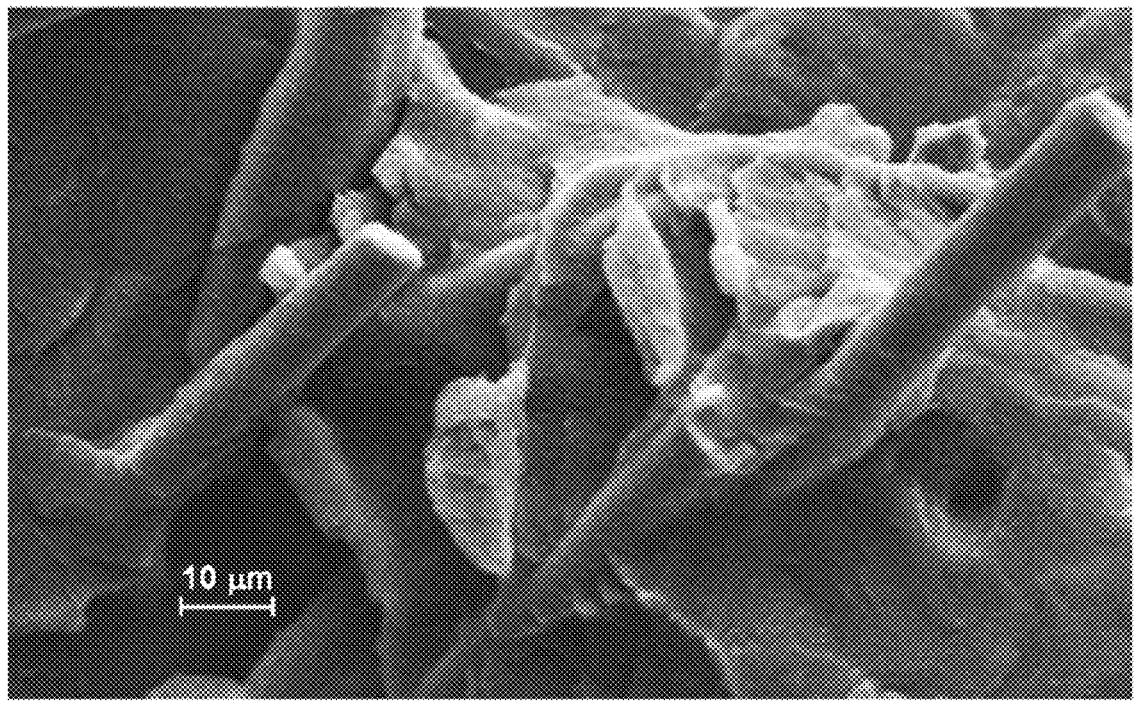
FIG. 8 is a scanning electron micrograph of the Example 28 with polystyrene, surface-treated glass fiber, and 2.5 weight percent of PPE-PHE-PPE triblock copolymer having 45% PPE.

FIG. 8 corresponds to Example 28, with 2.5 weight percent of PPE-PHE-PPE triblock copolymer having 45% PPE. There is good adhesion between polystyrene/poly(phenylene ether)-poly(hydroxy ether)-poly(phenylene ether) triblock copolymer resin and the glass fiber. There is no indication of any separation of the resin from the glass fiber.

Figure 9:
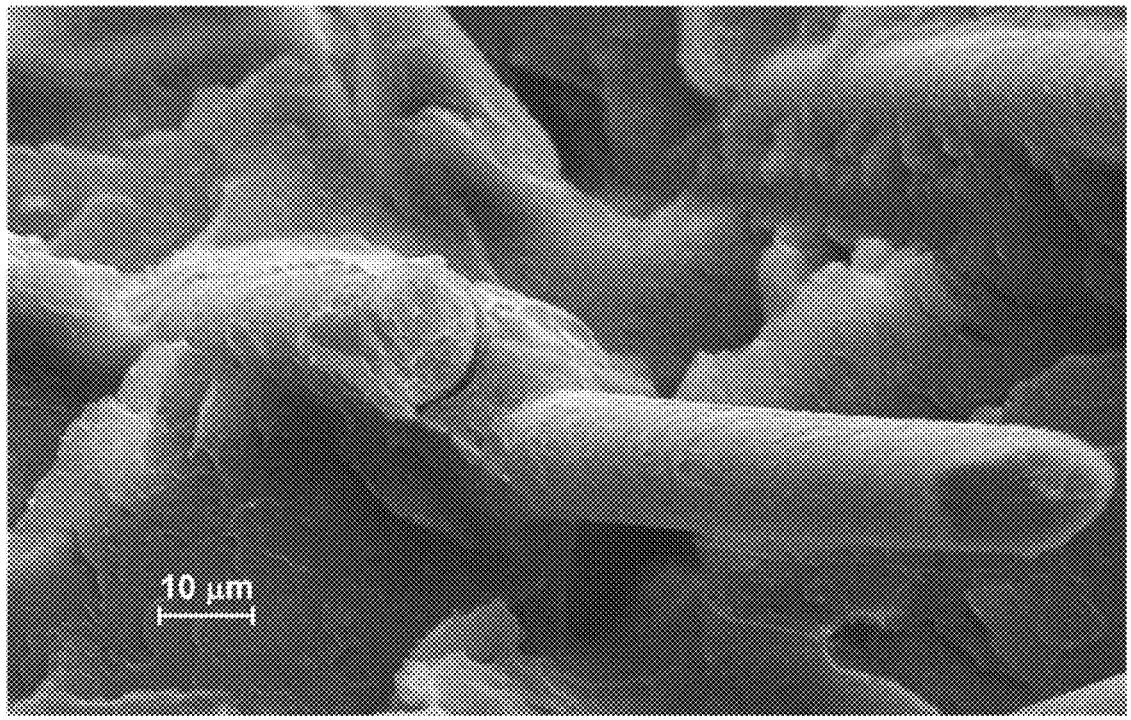
FIG. 9 is a scanning electron micrograph of the Example 29 composition with polystyrene, surface-treated glass fiber, and 5 weight percent of PPE-PHE-PPE triblock copolymer having 45% PPE.

FIG. 9 corresponds to Example 29 with 5 weight percent of PPE-PHE-PPE triblock copolymer having 45% PPE. There is good adhesion between polystyrene/poly(phenylene ether)-poly(hydroxy ether)-poly(phenylene ether) triblock copolymer resin and the glass fiber. There is no indication of any separation of the resin from the glass fiber.

Figure 10:
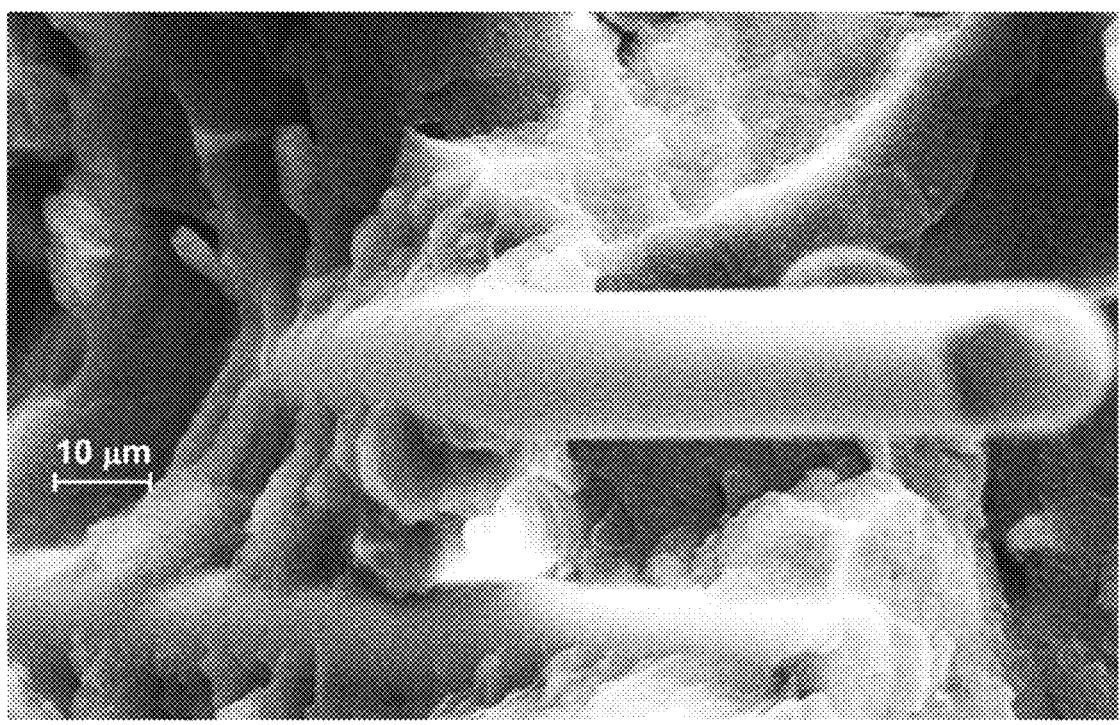
FIG. 10 is a scanning electron micrograph of the Example 30 composition with polystyrene, surface-treated glass fiber, and 10 weight percent of PPE-PHE-PPE triblock copolymer having 45% PPE.

FIG. 10 corresponds to Example 30 with 10 weight percent of PPE-PHE-PPE triblock copolymer having 45% PPE. There is good adhesion between polystyrene/poly(phenylene ether)-poly(hydroxy ether)-poly(phenylene ether) triblock copolymer resin and the glass fiber. There is no indication of any separation of the resin from the glass fiber.

The invention claimed is:

1. A poly(phenylene ether)-poly(hydroxy ether)-poly(phenylene ether) triblock copolymer, wherein each poly(phenylene ether) block independently has the structure

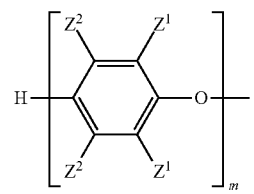

wherein m is 5 to 50; each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and wherein the poly(hydroxy ether) block has the structure

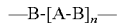

wherein A is a residue of structure

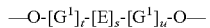

wherein each $G^1$ is independently at each occurrence a $C_6$-$C_{20}$ aromatic radical, and E is independently at each occurrence a direct bond, or a structure selected from the group consisting of

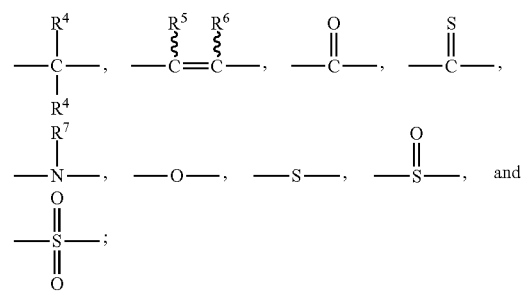

wherein each occurrence of $R^4$-$R^7$ is independently hydrogen or $C_1$-$C_{12}$ hydrocarbyl, s is 0 or 1, and t and u are each independently 1 to 10; and wherein B is a residue of structure

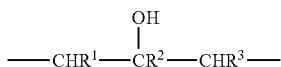

wherein $R^1$ to $R^3$ are each independently hydrogen, or $C_1$-$C_{12}$ hydrocarbyl; and wherein n is 2 to 60.

2. The poly(phenylene ether)-poly(hydroxy ether)-poly(phenylene ether) triblock copolymer of claim 1, exhibiting a first glass transition temperature of 95 to 115° C. and a second glass transition temperature of 170 to 220° C.

3. The poly(phenylene ether)-poly(hydroxy ether)-poly(phenylene ether) triblock copolymer of claim 1,
wherein each poly(phenylene ether) block independently comprises 2,6-dimethyl-1,4-phenylene ether units, 2,3,6-trimethyl-1,4-phenylene ether units, or a combination thereof;
wherein m is 10 to 40; and
wherein the poly(hydroxy ether) block has the structure

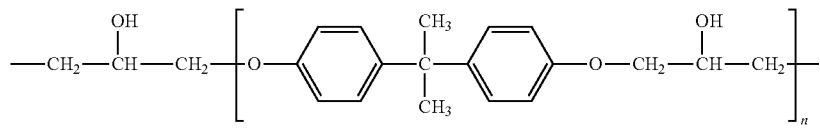

wherein n is 5 to 50.

4. The poly(phenylene ether)-poly(hydroxy ether)-poly(phenylene ether) triblock copolymer of claim 1, wherein each poly(phenylene ether) block independently has a number average molecular weight of 1,000 to 5,000 atomic mass units.

5. The poly(phenylene ether)-poly(hydroxy ether)-poly(phenylene ether) triblock copolymer of claim 1, comprising 30 to 70 weight percent poly(phenylene ether) blocks.

6. The poly(phenylene ether)-poly(hydroxy ether)-poly(phenylene ether) triblock copolymer of claim 1, wherein the poly(hydroxy ether) block has a number average molecular weight of 2,000 to 10,000 atomic mass units.

7. The poly(phenylene ether)-poly(hydroxy ether)-poly(phenylene ether) triblock copolymer of claim 1,
wherein each poly(phenylene ether) block independently comprises 2,6-dimethyl-1,4-phenylene ether units, 2,3,6-trimethyl-1,4-phenylene ether units, or a combination thereof;
wherein each poly(phenylene ether) block independently has a number average molecular weight of 1000 to 5000 atomic mass units;
wherein the poly(hydroxy ether) block has the structure

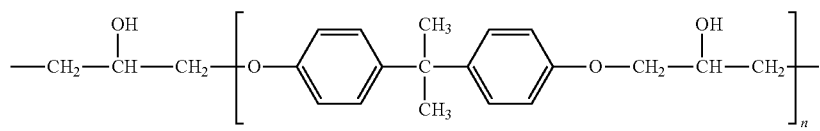

wherein n is 5 to 50; and wherein the poly(phenylene ether)-poly(hydroxy ether)-poly(phenylene ether) triblock copolymer exhibits a first glass transition temperature of 95 to 115° C. and a second glass transition temperature of 170 to 220° C.

8. A method of forming a poly(phenylene ether)-poly(hydroxy ether)-poly(phenylene ether) triblock copolymer, comprising: reacting a monohydroxy-terminated poly(phenylene ether) with a diepoxy-terminated poly(hydroxy ether) in the presence of a base.

9. A composition comprising, based on the total weight of the composition:
30 to 93 weight percent of a polar polymer selected from the group consisting of cellulose esters, poly(alkyl(meth)acrylate)s, polyamides, polycarbonates, polyesters, polyetherimides, polysulfones, polyethersulfones, poly(ethylene-ethyl acrylate)s, poly(ethylene-vinyl acetate)s, polyurethanes, poly(vinyl acetate)s, poly(vinyl alcohol)s, poly(styrene-acrylonitrile)s, poly(styrene-maleic anhydride)s, poly(vinyl butyral)s, and combinations thereof,
5 to 68 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof, and
2 to 20 weight percent of a poly(phenylene ether)-poly(hydroxy ether)-poly(phenylene ether) triblock copolymer.

10. The composition of claim 9, wherein the non-polar polymer is the poly(phenylene ether), optionally in combination with one or more of unhydrogenated block copolymers of alkenyl aromatic compounds and conjugated dienes, hydrogenated block copolymers of alkenyl aromatic compounds and conjugated dienes, and poly(alkenyl aromatic)s.

11. The composition of claim 9, wherein the polar polymer is the polyester, optionally in combination with one or more of cellulose esters, poly(alkyl(meth)acrylate)s, polyamides, polycarbonates, polyetherimides, polysulfones, polyethersulfones, poly(ethylene-ethyl acrylate)s, poly(ethylene-vinyl acetate)s, polyurethanes, poly(vinyl acetate)s, poly(vinyl alcohol)s, poly(styrene-acrylonitrile)s, poly(styrene-maleic anhydride)s, and poly(vinyl butyral)s.

12. The composition of claim 9, wherein the polar polymer is the polyamide, optionally in combination with one or more of cellulose esters, poly(alkyl(meth)acrylate)s, polyesters, polycarbonates, polyetherimides, polysulfones, polyethersulfones, poly(ethylene-ethyl acrylate)s, poly(ethylene-vinyl acetate)s, polyurethanes, poly(vinyl acetate)s, poly(vinyl alcohol)s, poly(styrene-acrylonitrile)s, poly(styrene-maleic anhydride)s, and poly(vinyl butyral)s.

13. The composition of claim 9,
wherein each poly(phenylene ether) block of the poly(phenylene ether)-poly(hydroxy ether)-poly(phenylene ether) triblock copolymer independently comprises 2,6-dimethyl-1,4-phenylene ether units, 2,3,6-trimethyl-1,4-phenylene ether units, or a combination thereof;
wherein each poly(phenylene ether) block of the poly(phenylene ether)-poly(hydroxy ether)-poly(phenylene ether) triblock copolymer independently has a number average molecular weight of 1000 to 5000 atomic mass units;
wherein the poly(hydroxy ether) block of the poly(phenylene ether)-poly(hydroxy ether)-poly(phenylene ether) triblock copolymer has the structure

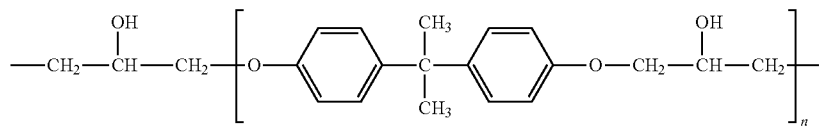

wherein n is 5 to 50; and
wherein the poly(phenylene ether)-poly(hydroxy ether)-poly(phenylene ether) triblock copolymer exhibits a first glass transition temperature of 95 to 115° C. and a second glass transition temperature of 170 to 220° C.

14. The composition of claim 9,
wherein each poly(phenylene ether) block of the poly(phenylene ether)-poly(hydroxy ether)-poly(phenylene ether) triblock copolymer comprises 2,6-dimethyl-1,4-phenylene ether units;
wherein each poly(phenylene ether) block of the poly(phenylene ether)-poly(hydroxy ether)-poly(phenylene ether) triblock copolymer independently has a number average molecular weight of 1500 to 3500 atomic mass units;
wherein the poly(hydroxy ether) block of the poly(phenylene ether)-poly(hydroxy ether)-poly(phenylene ether) triblock copolymer has the structure

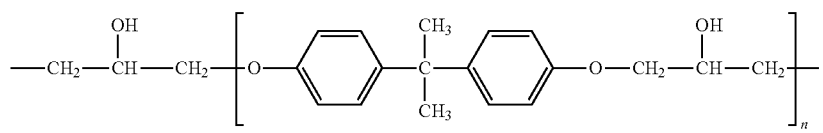

wherein n is 5 to 50;
wherein the poly(phenylene ether)-poly(hydroxy ether)-poly(phenylene ether) triblock copolymer exhibits a first glass transition temperature of 95 to 115° C. and a second glass transition temperature of 170 to 220° C.;
wherein the polar polymer is poly(ethylene terephthalate), poly(butylene terephthalate), or a combination thereof, and
wherein the non-polar polymer is a combination of the poly(phenylene ether) and the hydrogenated block copolymer of an alkenyl aromatic compound and a conjugated diene, optionally in further combination with one or more of unhydrogenated block copolymers of alkenyl aromatic compounds and conjugated dienes, and poly(alkenyl aromatic)s.

15. A composition comprising, based on the total weight of the composition:
30 to 93 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof,
5 to 50 weight percent of polar filler selected from the group consisting of glass fibers, glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, ceramic fibers, and combinations thereof, and
2 to 20 weight percent of a poly(phenylene ether)-poly(hydroxy ether)-poly(phenylene ether) triblock copolymer.

16. The composition of claim 15, wherein the non-polar polymer is the poly(alkenyl aromatic), optionally in combination with one or more of unhydrogenated block copolymers of alkenyl aromatic compounds and conjugated dienes, hydrogenated block copolymers of alkenyl aromatic compounds and conjugated dienes, and poly(phenylene ether)s.

17. The composition of claim 15, wherein the non-polar polymer is the poly(phenylene ether), optionally in combination with one or more of unhydrogenated block copolymers of alkenyl aromatic compounds and conjugated dienes, hydrogenated block copolymers of alkenyl aromatic compounds and conjugated dienes, and poly(alkenyl aromatic)s.

18. The composition of claim 15, wherein the polar filler is the glass fibers, optionally in combination with one or more of glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, and ceramic fibers.

19. The composition of claim 15,
wherein each poly(phenylene ether) block of the poly(phenylene ether)-poly(hydroxy ether)-poly(phenylene ether) triblock copolymer independently comprises 2,6-dimethyl-1,4-phenylene ether units, 2,3,6-trimethyl-1,4-phenylene ether units, or a combination thereof;
wherein each poly(phenylene ether) block of the poly(phenylene ether)-poly(hydroxy ether)-poly(phenylene ether) triblock copolymer independently has a number average molecular weight of 1000 to 5000 atomic mass units;
wherein the poly(hydroxy ether) block of the poly(phenylene ether)-poly(hydroxy ether)-poly(phenylene ether) triblock copolymer has the structure

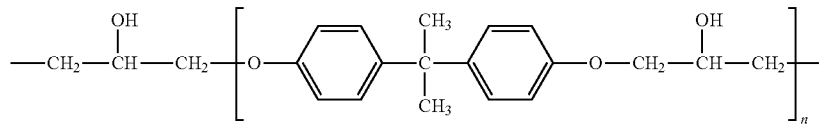

wherein n is 5 to 50; and
    wherein the poly(phenylene ether)-poly(hydroxy ether)-poly(phenylene ether) triblock copolymer exhibits a first glass transition temperature of 95 to 115° C. and a second glass transition temperature of 170 to 220° C.

20. The composition of claim 15,
    wherein the non-polar polymer is polystyrene, optionally in combination with one or more of unhydrogenated block copolymers of alkenyl aromatic compounds and conjugated dienes, hydrogenated block copolymers of alkenyl aromatic compounds and conjugated dienes, and poly(phenylene ether)s;
    wherein the polar filler is the glass fibers, optionally in combination with one or more of glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, and ceramic fibers;
    wherein each poly(phenylene ether) block of the poly(phenylene ether)-poly(hydroxy ether)-poly(phenylene ether) triblock copolymer comprises 2,6-dimethyl-1,4-phenylene ether units;
    wherein each poly(phenylene ether) block of the poly(phenylene ether)-poly(hydroxy ether)-poly(phenylene ether) triblock copolymer independently has a number average molecular weight of 1500 to 3500 atomic mass units;
    wherein the poly(hydroxy ether) block of the poly(phenylene ether)-poly(hydroxy ether)-poly(phenylene ether) triblock copolymer has the structure

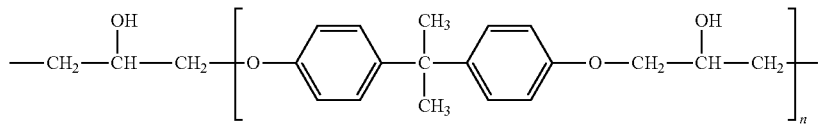

wherein n is 5 to 50; and
    wherein the poly(phenylene ether)-poly(hydroxy ether)-poly(phenylene ether) triblock copolymer exhibits a first glass transition temperature of 95 to 115° C. and a second glass transition temperature of 170 to 220° C.

* * * * *